US011342728B2

(12) United States Patent
Wise et al.

(10) Patent No.: US 11,342,728 B2
(45) Date of Patent: May 24, 2022

(54) CIRCUIT INTERRUPTERS WITH ELECTRONICALLY CONTROLLED LOCK OUT TAG OUT SYSTEMS AND RELATED ELECTRICAL DISTRIBUTION SYSTEMS AND METHODS

(71) Applicant: Eaton Intelligent Power Limited, Dublin (IE)

(72) Inventors: James I. Wise, Cranberry Township, PA (US); Andrew R. Smith, Pittsburgh, PA (US); Todd Shaak, Oakdale, PA (US); Brianna Groden, Wexford, PA (US); David Raymond Rohn, Venetia, PA (US); Robert William Mueller, Aliquippa, PA (US)

(73) Assignee: Eaton Intelligent Power Limited, Dublin (IE)

( * ) Notice: Subject to any disclaimer, the term of this patent is extended or adjusted under 35 U.S.C. 154(b) by 31 days.

(21) Appl. No.: 16/999,144

(22) Filed: Aug. 21, 2020

(65) Prior Publication Data
US 2021/0194221 A1 Jun. 24, 2021

Related U.S. Application Data

(60) Provisional application No. 62/951,415, filed on Dec. 20, 2019.

(51) Int. Cl.
*H02B 1/00* (2006.01)
*H02B 1/04* (2006.01)
(Continued)

(52) U.S. Cl.
CPC ........... *H02B 1/04* (2013.01); *H01H 71/1054* (2013.01); *H01H 71/74* (2013.01); *H02B 1/26* (2013.01)

(58) Field of Classification Search
CPC ........ H02B 1/04; H02B 1/26; H01H 71/1054; H01H 71/74
See application file for complete search history.

(56) References Cited

U.S. PATENT DOCUMENTS

| 4,503,408 A | 3/1985 | Mrenna et al. |
| 4,644,547 A | 2/1987 | Vercellotti et al. |

(Continued)

FOREIGN PATENT DOCUMENTS

| CN | 208970385 U | 6/2019 |
| WO | 2016181244 A1 | 11/2016 |

OTHER PUBLICATIONS

Invitation to Pay Additional Fees with Partial Search Report corresponding to International Patent Application No. PCT/EP2020/025595 (15 pages) (dated Apr. 26, 2021).
(Continued)

*Primary Examiner* — Adolf D Berhane
*Assistant Examiner* — Afework S Demisse
(74) *Attorney, Agent, or Firm* — Myers Bigel, P.A.

(57) ABSTRACT

Circuit breakers with a housing with a line side and a load side and an electronically controlled lock-out lock member coupled to the housing configured to electronically controllably travel between a first position and a second position. In the second position, the lock member is in a lock-out position and prevents the handle from moving to an ON position associated with electrical current conduction and in the first position the lock member is translated to a position that allows the handle to move to the ON position.

19 Claims, 17 Drawing Sheets

(51) Int. Cl.
*H02B 1/26* (2006.01)
*H01H 71/74* (2006.01)
*H01H 71/10* (2006.01)

(56) References Cited

U.S. PATENT DOCUMENTS

| | | | |
|---|---|---|---|
| 4,644,566 A | 2/1987 | Vercellotti et al. | |
| 4,653,073 A | 3/1987 | Vercellotti et al. | |
| 4,736,174 A | 4/1988 | Castonguay | |
| 4,786,885 A | 11/1988 | Morris | |
| 5,117,211 A | 5/1992 | Morgan et al. | |
| 5,315,531 A | 5/1994 | Oravetz et al. | |
| 5,341,191 A | 8/1994 | Crookston | |
| 5,548,523 A | 8/1996 | Wehrli, III et al. | |
| 5,627,716 A | 5/1997 | Lagree et al. | |
| 5,815,364 A | 9/1998 | Hurley et al. | |
| 5,910,760 A | 6/1999 | Malingowski et al. | |
| 6,055,145 A | 4/2000 | Lagree et al. | |
| 6,144,271 A | 11/2000 | Mueller et al. | |
| 8,222,983 B2 | 7/2012 | Zhou et al. | |
| 8,649,147 B2 | 2/2014 | Schlotterer et al. | |
| 2002/0005339 A1* | 1/2002 | Kurano | H02B 11/133 200/50.24 |
| 2004/0012262 A1* | 1/2004 | Uselli | B60R 25/04 307/10.5 |
| 2008/0081516 A1 | 4/2008 | Brandt et al. | |
| 2017/0149581 A1 | 5/2017 | Reidt | |
| 2019/0297492 A1 | 9/2019 | Bohrer et al. | |

OTHER PUBLICATIONS

E-T-A: Engineering Technologies "Are you compliant with the new NEC lockout/tagout requirements?" E-T-A Circuit Breakers, https://www.e-t-a.com/products/circuit_protection_devices/product_landing_page/x4230_lt/, 4 pages (2019).

* cited by examiner

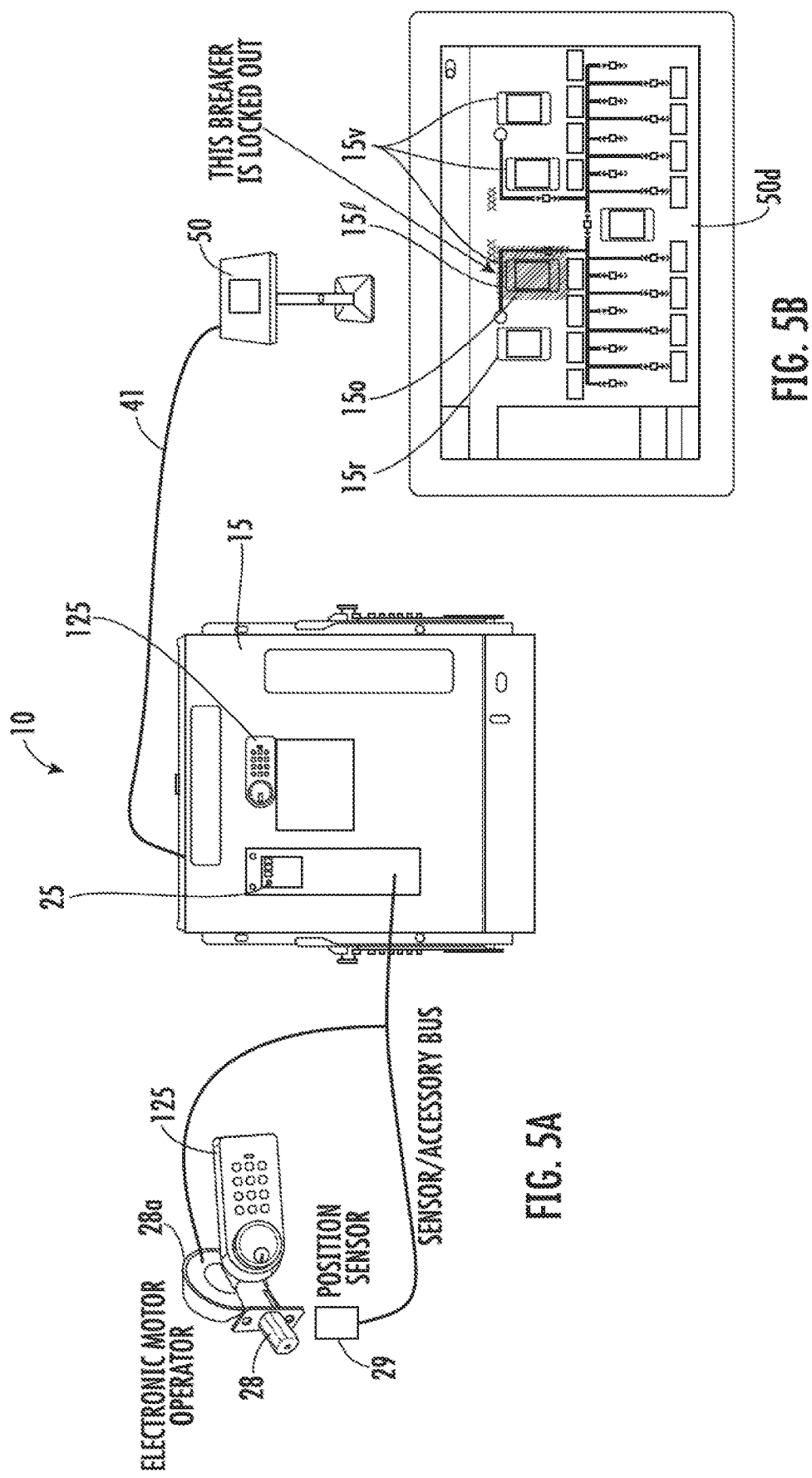

CIRCUIT INTERRUPTERS WITH ELECTRONICALLY CONTROLLED LOCK OUT TAG OUT SYSTEMS AND RELATED ELECTRICAL DISTRIBUTION SYSTEMS AND METHODS

RELATED APPLICATIONS

This application claims the benefit of and priority to U.S. Provisional Patent Application Ser. No. 62/951,415, filed Dec. 20, 2019, the contents of which are hereby incorporated by reference as if recited in full herein.

FIELD OF THE INVENTION

The present invention relates to circuit interrupters.

BACKGROUND OF THE INVENTION

Electrical switching apparatus such as circuit interrupters and, in particular, circuit breakers, are well known in the art. See, for example, U.S. Pat. No. 5,341,191, the contents of which are hereby incorporated by reference as if recited in full herein. Circuit interrupters provide overcurrent protection devices used for circuit protection and isolation. The circuit breaker provides electrical protection whenever an electric abnormality occurs. For example, Arc Fault Circuit Interrupters (AFCI) and Ground Fault Circuit Interrupters (GFCI) are among a variety of overcurrent protection devices used for circuit protection and isolation. Arc Fault Circuit Interrupters reduce fire hazards in electrical circuits by reducing the effects of high current arcing faults (parallel arcs) as well as detecting persistent low-current arcing faults (series arcs). Ground Fault Circuit Interrupters reduce the potential of electrical shock. Dual purpose AFCI/GFCI breakers are available which provide GFCI protection and AFCI protection as combination type breakers from Eaton Corporation. The circuit interrupters can provide conventional thermal and magnetic overcurrent protection.

In a typical circuit breaker, current enters the system from a power line and passes through a line conductor to a stationary contact fixed on the line conductor, then to a movable contact. The movable contact is fixedly attached to a pivoting arm. Arc chutes can be used to direct an arc away from the electrical contacts into the arc chute. The arc chute is situated proximate to the stationary contact of the circuit. As long as the stationary and movable contacts are in physical contact, current passes between the stationary contact and the movable contact and out of the circuit breaker to down-line electrical devices.

In the event of an overcurrent condition (e.g., a short circuit), extremely high electromagnetic forces can be generated. The electromagnetic forces can be used to separate the movable contact from the stationary contact. Upon separation of the contacts and blowing open the circuit, an arcing condition occurs. The breaker's trip unit will trip the breaker which will cause the contacts to separate. Also, arcing can occur during normal "ON/OFF" operations of the breaker.

Lock out and tag out (LOTO), also known as "Lock & Tag" is an important part of safety procedures. Conventionally, one or more physical external keyed locks and an external notification/warning tag are applied to a piece of electrical distribution equipment in a manner that precludes energy from reaching equipment. As is well known to those of skill in the art, an example of a physical lock used for LOTO is a mechanical trapped key interlock such as the Kirk® trapped key interlock from Kirk Key Interlock Company, North Canton, Ohio, that is placed on a circuit breaker to prevent its internal contacts from closing (and thus, energization).

SUMMARY OF EMBODIMENTS OF THE INVENTION

Embodiments of the invention are directed to circuit interrupters with electronically activatable lock-out locks that can be selectively operated to move to a locked-out position.

Embodiments of the invention generate and use virtual and/or electronic keys rather than requiring physical keys.

Embodiments of the invention can control movement of at least one lock-out lock based on electronic verification(s) that allow only the user initiating the lock-out state to remove the lock-out state and move the lock-out lock to an unlocked position.

Embodiments of the invention can provide electronically operated lock(s) to provide a lock-out state without requiring a physical key of a keyed interlock.

Embodiments of the invention are directed to circuit interrupters with an electronic lock out tag out system that controls a lock-out lock that is actuatable to move between locked and unlocked positions. When in the locked position, the lock blocks the circuit interrupter from being energized, such as blocking movement of an external switch handle to an ON position) so that an installed circuit interrupter does not allow current conduction between a line and a load side when the circuit interrupter is in a lock out tag out state. When in the unlocked position, the lock allows the circuit interrupter to be energized and/or allows the switch handle to move to an ON position.

Embodiments of the invention are directed to circuit interrupters that include a housing with a line side and a load side; a switch handle coupled to the housing; and an electronically operable lock comprising a lock member coupled to the housing configured to electronically controllably travel between a first position and a second position. In the second position, the lock member is in a lock-out position and prevents the handle from moving to an ON position associated with electrical current conduction, and in the first position, the lock member is in a position that allows the handle to move to the ON position.

The lock can have a lock solenoid that is spaced apart from a primary trip solenoid.

The lock can travel in a direction that is toward the handle to move to the second position and travels in an opposing direction that is inward away from the handle to move to the first position.

The lock can travel in a direction that is perpendicular to a direction of travel of the primary trip solenoid.

The circuit interrupter can comprise a display and when in the LOTO state, the display can display a LOTO status and/or warning.

The circuit interrupter can include a transceiver that communicates with the trip unit and at least one mobile device to deploy the lock-out lock to move either to the first or the second position.

The at least one mobile device can comprise and/or be in communication with an APP that communicates with one or more circuit interrupters to control actuation of the lock-out lock to move to the locked and unlocked positions.

The at least one lock-out lock can comprise a lock-out solenoid that can be part of a trip unit of the circuit interrupter.

The lock member of the lock can physically block the handle from moving and provides a force that resists manual movement of the handle in a range of 10 lbf (foot pounds) to 10,000 lbf (foot pounds) when in the locked-out position.

Embodiments of the invention are directed to circuit interrupters. The circuit interrupters include a housing with a line side and a load side; a switch handle coupled to the housing; and an electronically operable lock with a lock member configured to electronically controllably travel between a first position and a second position. In the second position, the lock member is in a lock-out position and prevents the handle from moving to an ON position associated with electrical current conduction. In the first position, the lock member is in a position that allows the handle to move to the ON position.

The lock member can include a lock solenoid that can be spaced apart from a primary trip solenoid.

The lock solenoid can travel in a direction that is toward the handle to move to the second position and can travel inward away from the handle to move to the first position.

The lock solenoid can travel in a direction that is perpendicular to a direction of travel of the primary trip solenoid.

The circuit interrupter can further include a position sensor in the housing configured to confirm whether the lock member is in the second position.

The circuit interrupter can also include a display held by the housing and at least one processor in the housing in communication with the primary trip solenoid and the lock member. When the lock member is in the second position, the display can display visual indicia of a lock out tag out status of the circuit interrupter, optionally with a "DO NOT OPERATE" warning and a name of a person placing the circuit interrupter in the lock out tag out status.

The lock member can be configured to controllably move to the first position and/or the second position in response to activation of an actuator of the lock member by one or more defined electronic keys transmitted to a component of or coupled to (e.g., a trip unit of) the circuit interrupter by a user.

The circuit interrupter can further include a transceiver held by or in the housing and in communication with the lock member. The transceiver can be configured to receive control signals from a first mobile device of a first user to cause the lock member to move to the second position.

The transceiver can be configured to receive control signals from a mobile device of a user and can be configured to only allow the lock member to move to the second position if the user is the first user and/or the mobile device is the first mobile device to thereby provide additional layer of safety for removing the lock out status by only the original, first user.

The primary trip solenoid and the lock member can be provided as components of a trip unit in the housing. The trip unit can include a communications interface with a display and can be configured to communicate with a communications bus of an electrical distribution system.

The trip unit can further include: a printed circuit board coupled to at least one processor and a movable contact arm.

The circuit interrupter can be configured to wirelessly communicate with a mobile device comprising and/or in communication with an APP to provide a digital key to control movement of the lock member.

The circuit interrupter can be configured to require multiple electronic keys before electronically directing the lock member to move from the second position to the first position.

Other embodiments are directed to electrical distribution systems. The systems include: a housing and a plurality of circuit breakers held by the housing, each having at least one lock-out lock and trip unit with a display. The at least one lock-out lock is electronically selectively controlled to be moveable to a locked position and to an unlocked position. The locked position is associated with a locked-out state of the circuit breaker associated with an OFF state of non-conduction. The systems further include a dashboard in communication with the plurality of circuit breakers. The dashboard displays status of the circuit breakers as one of: in a locked-out state; in an ON state associated with (electrical) conduction; in an OFF state associated with (electrical) non-conduction; or in a tripped state. The dashboard is configured to receive a lock-out state signal from a respective circuit breaker when placed in a locked-out state and/or after a position sensor in or on the circuit breaker has verified that the at least one lock-out lock is properly deployed to the locked position.

At least one of the circuit breakers can be configured to require multiple electronic keys to be communicated thereto before electronically directing the lock-out lock thereof to move from the locked position to the unlocked position.

The circuit breakers can be configured to wirelessly communicate with mobile devices comprising and/or in communication with an APP used to control movement of the at least one lock-out lock.

The circuit breakers can be configured to wirelessly communicate with a mobile device comprising and/or in communication with a lock out tag out (LOTO) APP to control movement of the at least one lock-out lock (typically using a digital key provided by the APP).

Yet other embodiments are directed to methods of operating a current interrupter. The methods include: providing a circuit interrupter with an electronically controllable lock-out lock; electronically receiving at least one digital key; then electronically directing the lock-out lock to move to a locked position associated with a lock out state of the circuit interrupter to block a handle from moving to an ON position associated with conduction; and displaying a "do not operate" message on a display of the circuit interrupter when in the lock out state thereby providing a warning tag out alert for the circuit interrupter.

The method can further include electronically sending a lock-out state signal to a dashboard to indicate a lock-out status of a respective circuit interrupter when in a lock-out state.

The method can further include electronically receiving at least one digital key before electronically directing the lock-out lock to move from the locked position to an unlocked position.

The at least one digital key can optionally be provided by a lock-out tag-out APP using a mobile device of a user.

The electronically receiving at least one digital key before electronically directing the lock-out lock to move from the locked position to the unlocked position can require multiple electronic keys as the at least one digital key before allowing the lock-out lock to move from the unlocked position.

The method can further include electronically generating one or multiple electronic keys that are operable for allowing a user to concurrently direct movement of a plurality of lock-out locks of different circuit interrupters to the locked position or to an unlocked position.

Yet other embodiments are directed to field retrofit lock-out lock systems for a circuit breaker. The kits include a bracket configured to couple to a housing of a circuit breaker and an electromechanical actuator assembly coupled to or coupleable to the bracket. The electromechanical actuator assembly includes: an electronic control circuit configured to accept a digital key input from a user; an actuator in communication with the electronic control circuit; and a lock member controlled by the actuator. The actuator is configured to move the lock member in first and second directions between first and second positions relative to a switch handle of the circuit breaker in response to directions from the electronic control circuit. In the first position, the lock member blocks the switch handle from moving and in the second position, the lock member unblocks the switch handle.

The electronic control circuit can include a transceiver.

The electronic control circuit can be configured to wirelessly communicate with a mobile device comprising and/or in communication with an APP to control the actuator to move the lock member only upon receipt of a defined digital key input provided to the mobile device by the APP.

The bracket and actuator assembly can reside external to the housing of the circuit breaker.

The electronic control circuit can be configured to require multiple defined electronic key inputs before directing the actuator to move the lock member from the first position to the second position.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 5A is a partially exploded view of components of an example circuit breaker with electronic lock-out according to embodiments of the present invention.

FIG. 5B is an enlarged partial view of a dashboard shown in FIG. 5A according to embodiments of the present invention.

DETAILED DESCRIPTION OF EMBODIMENTS OF THE INVENTION

Figure 1:
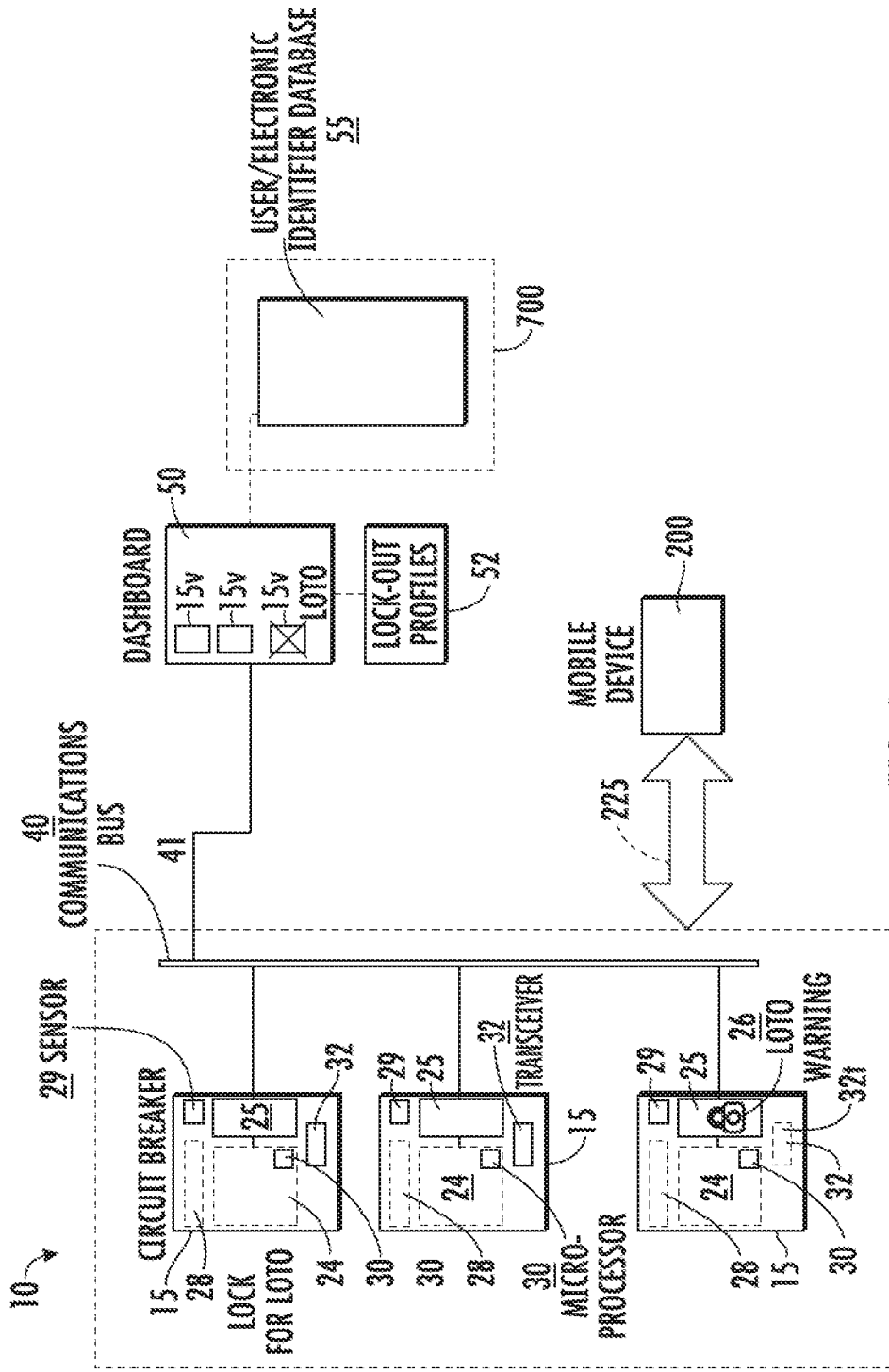
FIG. 1 is a schematic illustration of an electrical distribution system according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art. The term "Fig." (whether in all capital letters or not) is used interchangeably with the word "Figure" as an abbreviation thereof in the specification and drawings. In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "bottom", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass orientations of above, below and behind. The device may be otherwise oriented (rotated 90° or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The term "about" refers to numbers in a range of +/−20% of the noted numerical value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Embodiments of the present invention are directed to circuit interrupters with electronic lock out tag out systems configured to prevent energization or conduction of electrical current between line and load sides during servicing, for example. The figures illustrate circuit breakers as an example circuit interrupter but embodiments of the present invention may be useful for other circuit interrupters including fused disconnect switches, for example.

The term "APP" refers to a computer program configured to provide defined functionality on a computer including pervasive computing devices and/or mobile devices such as an electronic notebook or notepad, smart phone, laptop, and the like. In some embodiments, the functionality of the APP may be accessible via an icon on a display of the computer and/or may be accessed by other user input, such as input provided by a typed or spoken user interface of the computer. The computer program may comprise computer program code configured to reside in a memory of the computer to be accessed and executed by a processor or other computing circuit of the computer, but the embodiments of the invention are not limited thereto. In some embodiments, the computer program code, processor, and/or memory may be located remotely from the computer providing the functionality, such as in a networked environment, or "cloud."

As employed herein, the term "processor" shall mean a programmable analog and/or digital device that can store, retrieve, and process data; a computer; a workstation; a personal computer; a digital signal processor (DSP); a microprocessor; a microcontroller; a microcomputer; a central processing unit; a mainframe computer; a mini-computer; a server; a networked processor; a programmable logic device (PLD); a combination of a plurality of logic gates; or any suitable processing device or apparatus.

As employed herein, the terms "electronic key" and "digital key" are used interchangeably and mean a defined electronic alphanumeric code that is associated with a respective user. The digital key can be a unique identity code associated with a mobile device of a respective user, such as, for example, an International Mobile Equipment Identity (IMEI) and/or an IP address. The digital key can be provided by an APP or other electronic key generation and/or identity verification system. The digital key can be provided by an authorized user database and/or user access system in communication with an authorized user database. The digital key can be provided to an internal lock-out interlock system of a circuit breaker and/or external and coupled to the circuit breaker via a communications interface including, for example, a Bluetooth communication connection with a respective mobile device. The digital key can be entered via a Human Machine Interface (HMI) such as via a display user interface or a keypad or reader input of the circuit breaker.

As employed herein, the term "trip unit style" shall mean a particular trip unit style corresponding to a particular style identifier; a particular trip unit style corresponding to a particular communication message structure for settings, real-time data and/or event data; or a particular trip unit manufacturing configuration that determines the capabilities of the trip unit. A given style trip unit has a non-varying structure for settings, real-time data or event data. Non-limiting examples of style differences include number of poles, ground fault capabilities, IEC vs. IEEE curves, and maintenance mode capable.

Example embodiments are described in association with a four-pole circuit breaker, although the disclosed concept is applicable to electrical switching apparatus having any number of poles.

Figure 2:
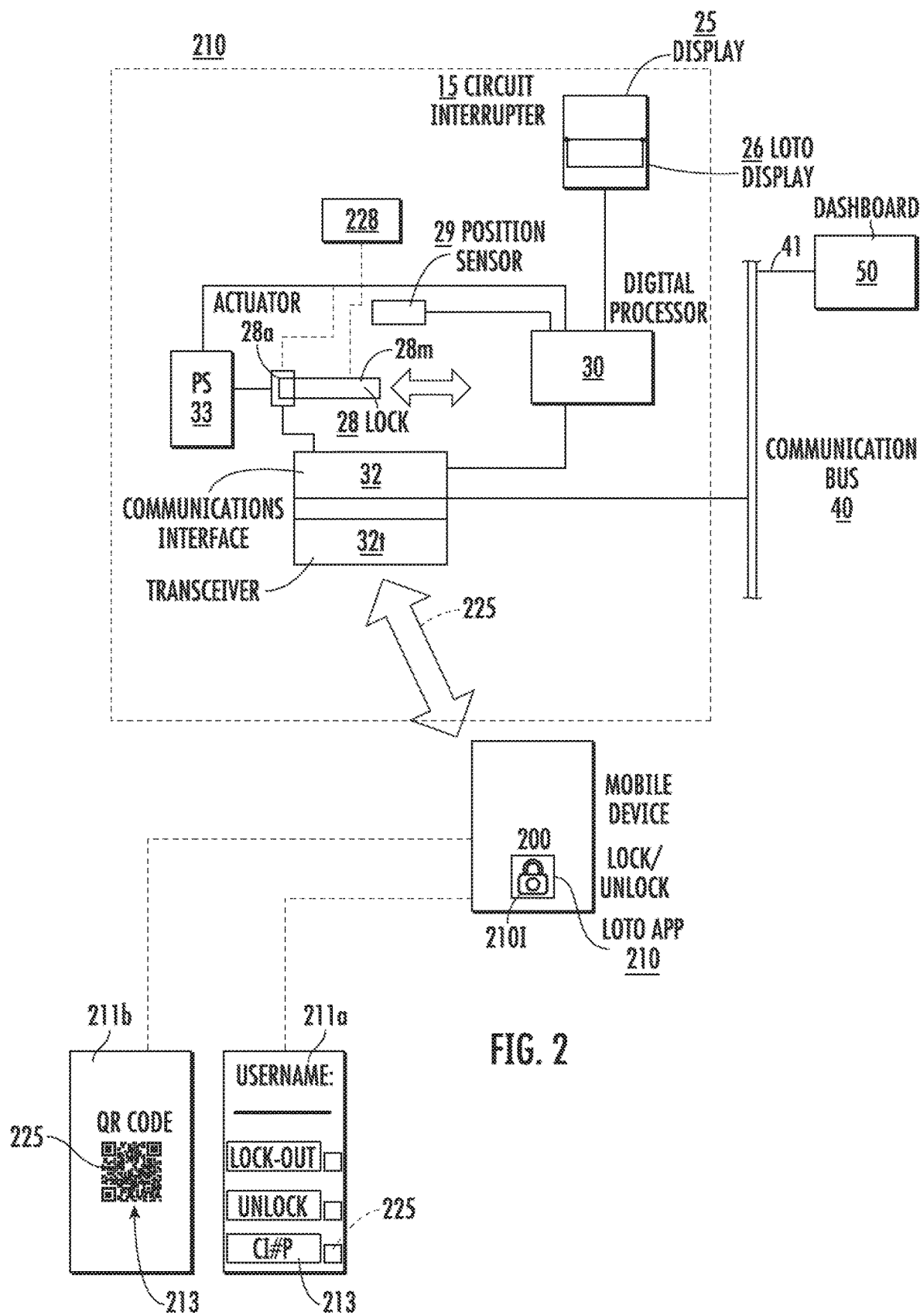
FIG. 2 is another schematic illustration of an electrical distribution system according to embodiments of the present invention.
Figure 3:
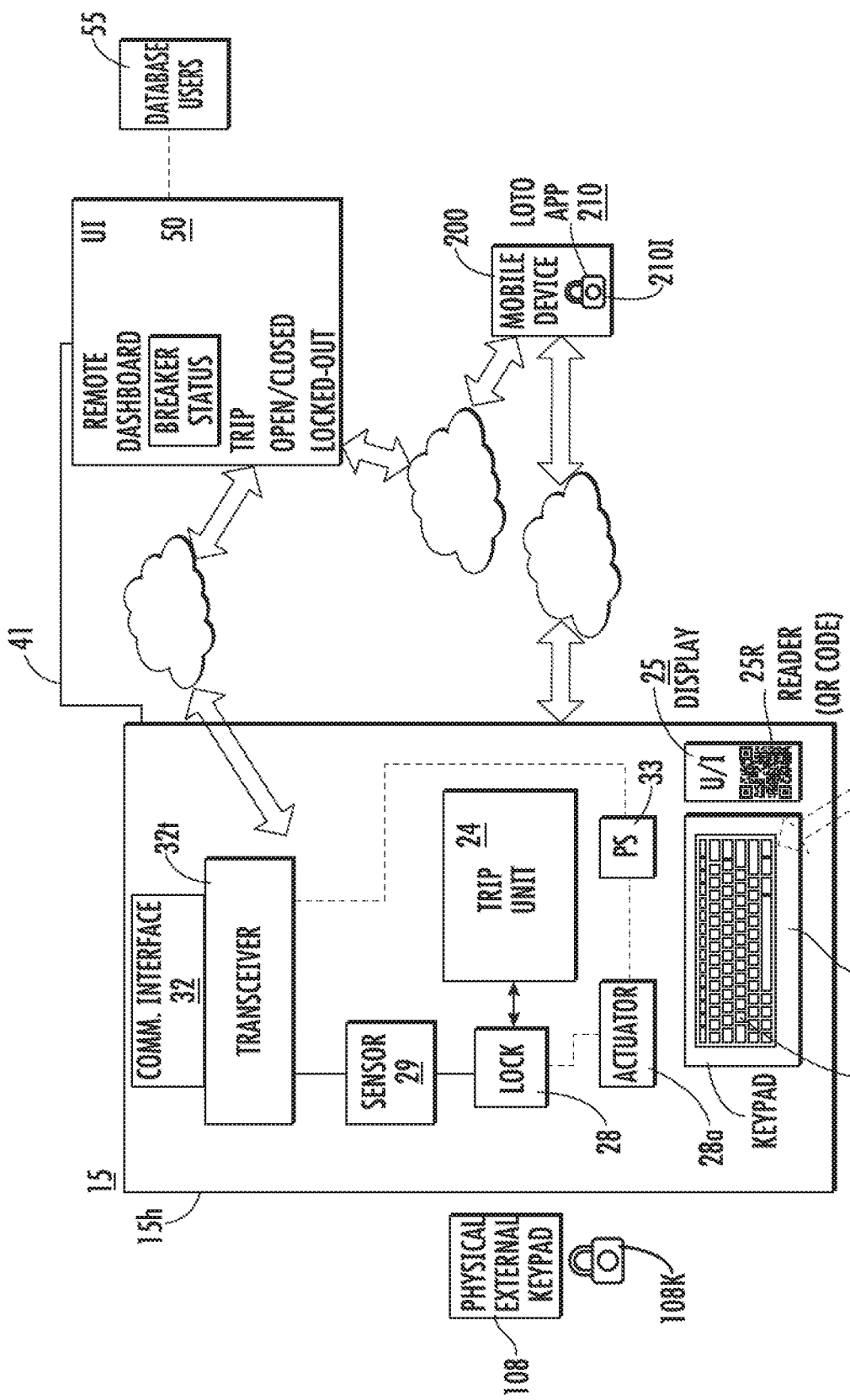
FIG. 3 is another schematic illustration of an electrical distribution system according to embodiments of the present invention.

Turning now to FIGS. 1-3, example electrical distribution systems 10 are shown. The systems 10 comprise a plurality of circuit interrupters 15 such as circuit breakers 15b. The circuit interrupters 15 each comprise a trip unit 24. Generally stated, and as is well known to those of skill in the art, the circuit interrupters each have separable main contacts that may be operated either manually by way of a switch handle 228 (FIG. 2) disposed on the outside of the case or automatically in response to an overcurrent condition. The switch handle 228 can move vertically between ON and OFF positions or may be a rotary handle that rotates circumferentially at least 90 degrees between the ON and OFF positions. Typically, the circuit interrupters 15 include an operating mechanism, which is designed to rapidly open and close the separable main contacts. The circuit interrupters 15 can each include a trip unit 24, which senses overcurrent conditions in an automatic mode of operation. Upon sensing an overcurrent condition, the trip unit 24 trips the operating mechanism to a trip state, which moves the separable contacts to their open position. The term "trip unit" is well known to those of skill in the art and refers to certain components in the circuit interrupter 15, including a microprocessor 30, power supply 33 (FIG. 4A) and circuitry that control a trip actuator (solenoid) 8 (FIG. 4A) that causes main contacts to separate and monitors for current and voltage signals, for example. See, e.g., U.S. Pat. No. 8,649, 147 for examples of trip units 24, the contents of which are hereby incorporated by reference as if recited in full herein.

The microprocessor 30 can be configured to, inter alia, monitor for and/or detect various types of overcurrent trip conditions and to provide various protection functions, such as, for example, a long delay trip, a short delay trip, an instantaneous trip, and/or a ground fault trip. See, for example, U.S. Pat. Nos. 5,910,760; 6,144,271; and 8,649, 147, the contents of which are hereby incorporated by reference as if recited in full herein.

Each circuit interrupter 15 can include at least one lock-out lock 28 configured to allow a user to electronically direct the lock-out lock 28 to move to a locked position from an unlocked position to provide a lock out tag out (LOTO) state of the circuit interrupter 15. In the locked position, the at least one lock-out lock 28 prevents the circuit interrupter 15 from being energized, e.g., prevents the main contacts from closing. The at least one lock-out lock 28 can be configured to physically block a switch handle 228 (FIGS. 2, 4A) coupled to the circuit interrupter 15 from being able to move to an ON position (associated with conduction) when in the locked position.

The switch handle 228 can extend outwardly from a housing 15h of the circuit interrupter 15. As is well known to those of skill in the art, when the circuit interrupter 15 is a circuit breaker 15b (FIGS. 4A, 4B, 13), the housing 15h can also enclose the stationary contact and the movable arm 840 (FIG. 13) with the movable contact and other circuit breaker components.

The at least one lock-out lock 28 can be positioned and configured to directly physically block this switch handle 228 in a locked state.

The switch handle 228 can reside inside a cabinet 100 of a power distribution system (FIG. 16) and can couple to an externally accessible switch handle 1228 that can be accessible via a cover of the cabinet 100 (FIG. 16) and the handles 228, 1228 can move in concert. The at least one lock-out lock 28 can directly block/couple to the externally accessible switch handle 1228 in the locked state, which, in turn, blocks the internal switch handle 228 from movement in the locked state. The cabinet 100 can hold a plurality of circuit interrupters 15 between feeder sections $150_1$, $150_5$ (FIG. 16) and some or all can include the at least one electronically operable lock-out lock 28. For examples of cabinets with buckets having circuit interrupters and cooperating internal and external switch handles, see, e.g., U.S. Pat. No. 10,186, 847 (see, e.g., FIG. 4B), the contents of which are hereby incorporated by reference as if recited in full herein.

The at least one electronically operable lock-out lock 28 can be configured to provide an anti-rotational force against the handle 228 and/or handle 1228 that cannot easily, if at all, be overcome by manual brute force of a user's hand attempting to move the handle to the ON position when the at least one lock-out lock 28 is engaged. In some example embodiments, this force "F" can be in a range of 10 lbf to 10,000 lbf ("lbf" refers to "foot pounds").

Each circuit interrupter 15 can also include at least one position sensor 29 that can provide data to confirm that the at least one lock-out lock 28 is fully deployed to the proper, secure, locked position. The at least one position sensor 29 can be coupled to the communications interface 32 or other circuitry for providing confirmation of position to the dashboard 50 and/or the mobile device 200. The at least one position sensor 29 can comprise a proximity sensor, a (digital) camera, an optical sensor such as an optical encoder, a potentiometer, an LVDT, a capacitive linear electrode or other position sensor or combinations of different types of position sensors.

The at least one lock-out lock 28 can comprise and/or be an internal lock-out lock 28 that resides entirely or partially inside the housing 15h of the circuit interrupter 15.

The circuit interrupter 15 may also comprise a display 25. When the at least one lock-out lock 28 is moved to the locked position, the display 25 can present visual indicia 26 that identifies a lock out state such as a warning, icon or other visual and/or textual data identifying the lock out state. The trip unit 24 can be configured to automatically cause the display 25 to display the visual indicia 26 responsive to the lock-out lock 28 being moved to the locked position. The visual indicia 26 can provide a textual and/or graphic display output to the display 25 such as a textual "DO NOT OPERATE" indicia and/or a textual "WARNING" indicia and/or a defined graphic visual, optionally over a background of red diagonal lines.

The at least one lock-out lock 28 may be configured to operate in response to verification/input of an electronic key to thereby allow only a user that electronically initiated the LOTO state of the circuit interrupter 15 to electronically remove that state. Upon receipt/input of the electronic (digital) key, the circuit interrupter 15 can electronically direct an actuator 28a (FIGS. 2, 4A) that is coupled to the at least one lock-out lock 28 to move/actuate to move the associated lock member 28m to the unlocked position as will be discussed further below.

The circuit interrupters 15 can communicate with at least one dashboard 50 over a communication bus 40. The dashboard 50 can comprise a display that illustrates operational status of virtual circuit interrupters 15v corresponding to the actual circuit interrupters 15.

The communication bus 40 can be hard wired to the dashboard 50 via a communications cable 41 and/or may wirelessly communicate with the dashboard 50. The communications bus 40 can comprise a Modbus® configuration or other communications bus configuration.

In some embodiments, each circuit interrupter 15 can comprise a communications interface 32 that can communicate with the dashboard 50. The communications interface 32 can be coupled to a dashboard 50 via a communication bus 40.

The system 10 can optionally include a database 55 that correlates different (authorized) users to different electronic identifiers. The database 55 can reside at least partially in the dashboard 50 or remotely in one or more servers. The circuit interrupter 15 can be configured to electronically identify a user that initiates the lock-out state and provide a name of the user to the display 25, as well as a date that the lock-out state is made. The name and/or date can also be transmitted to the dashboard 50. The database 55 can be configured to generate a one-time digital lock out key and/or a digital unlock key that may have a defined time limit before expiring. The time limit may be in minutes, hours or one (1) or more days.

The communications interface 32 of each circuit interrupter 15 can comprise a transceiver 32t.

In some embodiments, the transceiver 32t that can wirelessly communicate with a mobile communications device 200 of a user (service or installation personnel, for example)

to direct the at least one lock-out lock 28 to move to the locked position or the unlocked position.

Referring to FIG. 2, a schematic illustration of an example circuit interrupter 15 showing certain circuit components facilitating the electronic lock-out system is shown. As shown, the circuit interrupter 15 includes a microprocessor 30, a display 25, a position sensor 29, at least one lock-out lock 28, a power supply 33 and a communications interface 32, which can include a transceiver 32*t*. The communications interface 32 can communicate with the dashboard 50 via a communications bus 40 as discussed above.

The at least one lock-out lock 28 can reside entirely in the housing 15*h* of the circuit interrupter 15 or may reside entirely or partially external to the housing 15*h* of the circuit interrupter 15.

The at least one lock-out lock 28 can reside in the housing 15*h* in an unlocked position and may reside at least partially outside the housing 15*h* in the locked position. Where more than one lock-out lock 28 is used, one may reside inside the housing 15*h* and one may reside outside the housing 15*h*.

In some embodiments, a mobile device 200 of a user can wirelessly, such as via BLUETOOTH wireless technology, communicate with the communications interface 32 to move the at least one lock-out lock 28 to a blocked or unblocked position. The position sensor 29 can provide data that confirms that the at least one lock-out lock 28 is properly deployed to the locked position or that provides a warning that the lock 28 is not properly positioned. The display 25 can display the visual indicia 26 of the LOTO status of the circuit interrupter 15. The microprocessor 30 and/or the communications interface 32 can direct the actuator 28*a* to actuate to move the at least one lock-out lock 28 to the locked or unlocked position based on the wireless communication from the user via the mobile device 200.

As shown in FIGS. 2 and 3, the mobile device 200 can comprise a LOTO APP 210 that can provide electronic key data for a user to use to initiate the LOTO state and/or remove the LOTO state of one or more circuit interrupters 15. The LOTO APP 210 may optionally be accessed by an icon 2101 graphically illustrating a keyed-lock, for example.

The at least one lock-out lock 28 may be used in place of conventional physical keyed locks such as padlocks and hasps or handle blocks and/or mechanical interlocks such as Kirk® key interlocks. Embodiments of the invention can be configured to reduce the possibility of, if not eliminate the possibility of, an unauthorized user with a duplicate physical key used to unlock a circuit interrupter 15 that is in a LOTO state. A user can electronically control the at least one lock-out lock 28 via use of one or more electronic keys 225.

The electronic keys 225 can be provided by the system 10, optionally by the dashboard 50 and/or remote database 55. A respective electronic key 225 can be different for different users, different for a respective user and each circuit interrupter 15, generated as a unique code with an expiration date and time, or provided in other desired formats.

FIG. 3 illustrates that the at least one lock-out lock 28 can comprise an actuator 28*a* coupled to a power supply 33. The power supply 33 can comprise a battery or a hard-wired power source. The power supply 33 can be an inductively powered power supply. The power supply 33 can be internal or external to the housing 15*h* of the breaker 15.

The actuator 28*a* can be a linear actuator or a rotary actuator.

The electronically controlled at least one lock-out lock 28 may optionally be used with a conventional externally keyed mechanical/manually physically operated interlock 108 which uses a physical key 108*k* to open to remove the LOTO state of the circuit interrupter 15. This can provide an additional layer of security as a user that initiated the lock-out state can have a unique electronic key or access code for the lock-out lock 28 even if a different user is able to obtain a duplicate physical key and unlock the externally manually operable keyed interlock 108.

FIG. 3 also illustrates that the circuit interrupter 15 can comprise a keypad 125 as an HMI 1125 as well as the display 25. A user can enter a (unique) code that can be entered using the keypad 125 to electronically direct the at least one lock-out lock 28 to selectively move to the locked or the locked position. The display 25 may optionally include a reader 25R such as a barcode or quick read (QR) code reader that can read a barcode or QR code provided as the electronic key 225 by the mobile device 200 to allow the user to initiate or remove the LOTO state.

As shown in FIG. 2, the LOTO APP 210 can provide data windows 211*a*, 211*b* that support a user's ability to direct the at least one lock-out lock 28 to move to the locked or unlocked position. For example, one window 211*a* can be configured to allow a user to select a locked or unlocked position (211*a*) of the at least one lock-out lock 28. That same window or a different window may be configured to allow a user to enter a serial number or other identifier of a target circuit interrupter 15 (which can also be directly uploaded or identified using the communications interface 32 of a respective circuit interrupter 15), and/or enter a user name (which can also be auto-filled in the data segment based on the electronic data of the mobile device associated with that person) of a person seeking to initiate or remove the LOTO state and the like.

As shown in FIG. 2, the LOTO APP 210 can optionally generate a unique code 213 assigned to a user providing the electronic key 225 for a particular requested LOTO initiation or removal of one or more circuit interrupters 15. That unique code 213 can be generated by and/or received or accessed using the LOTO APP 210.

Figure 4A:
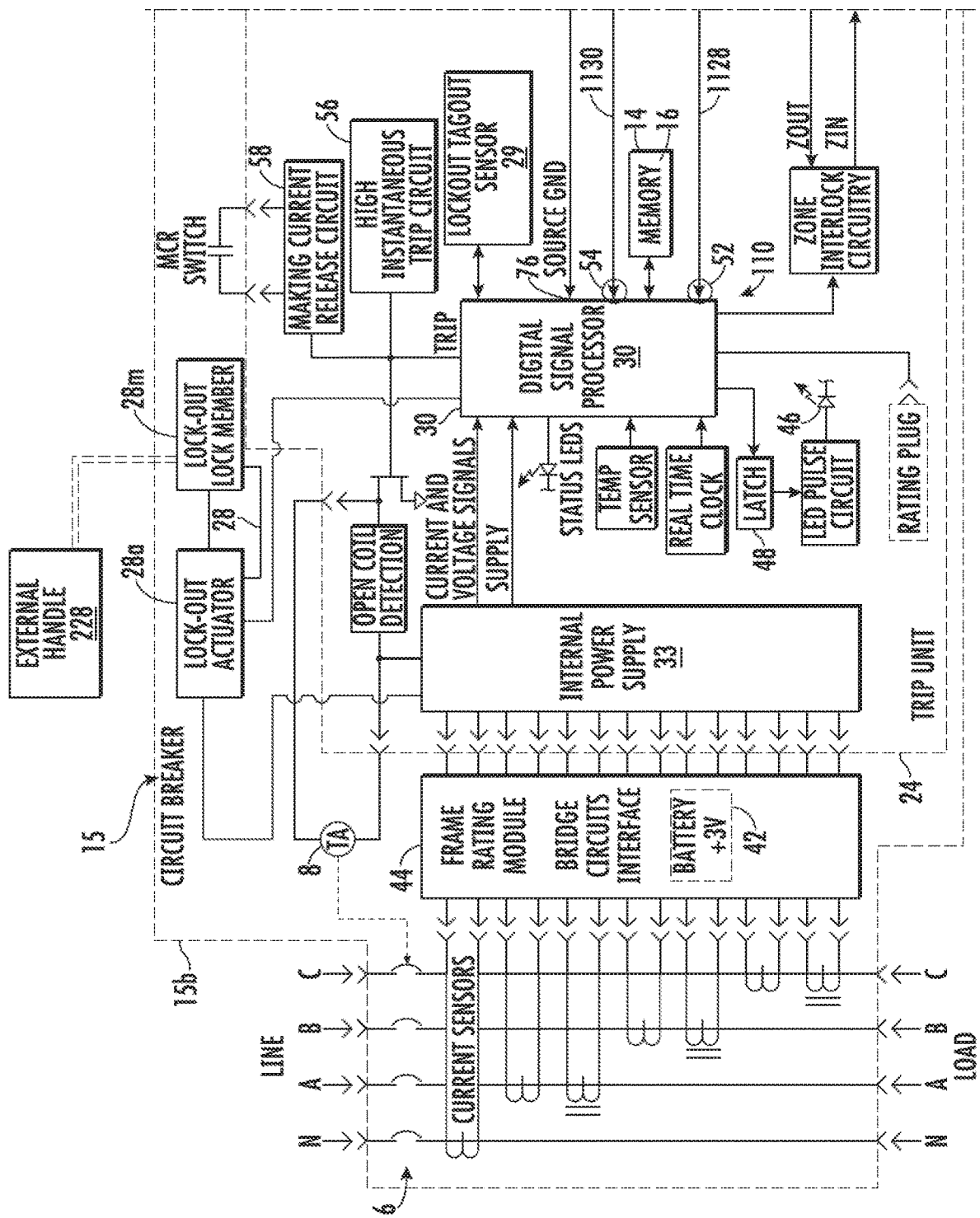
FIG. 4A and FIG. 4B is a circuit diagram of an example circuit interrupter with trip unit according to embodiments of the present invention.
Figure 4B:
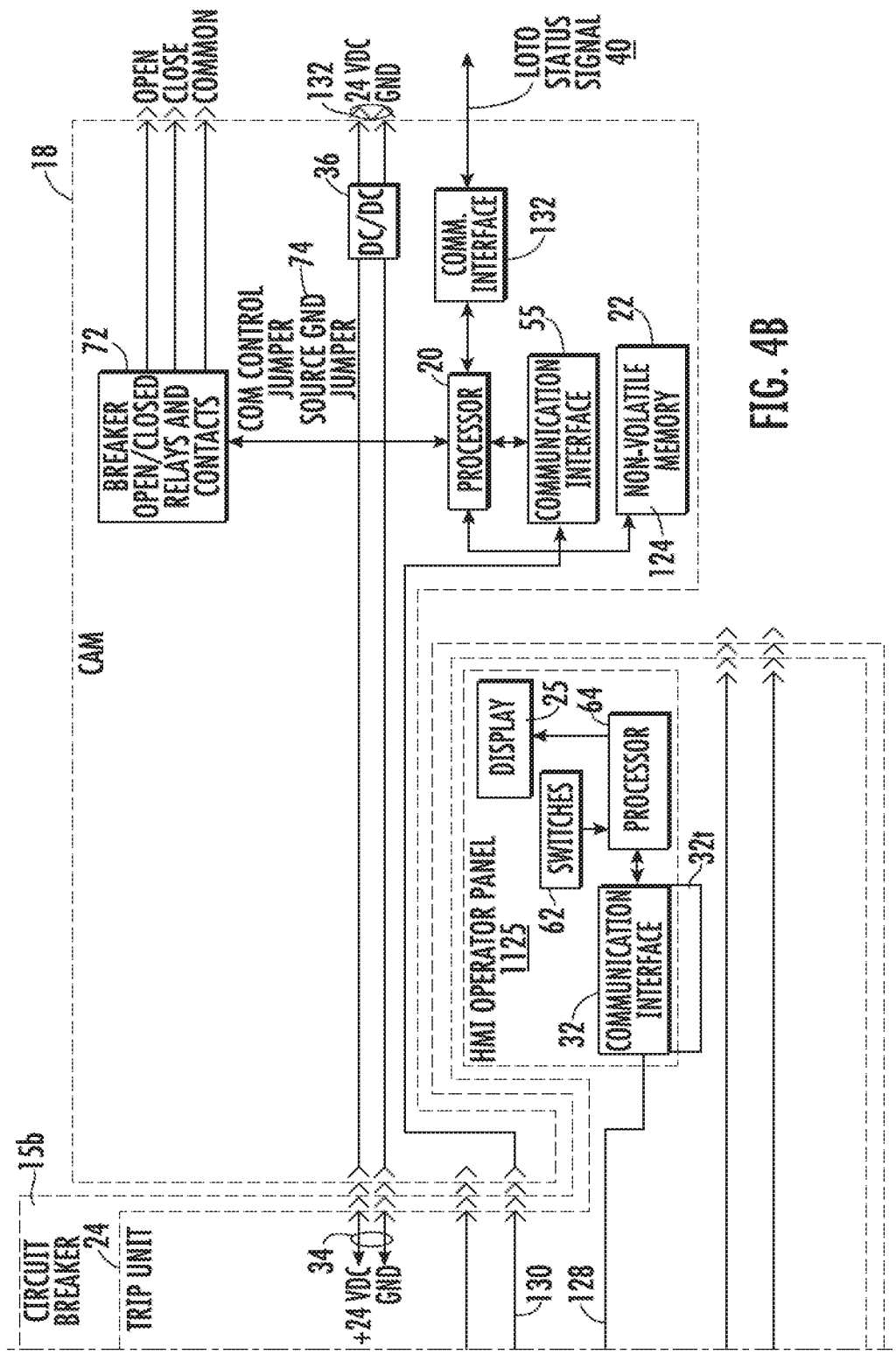

FIGS. 4A and 4B illustrate an example circuit breaker 15*b* with a trip unit 24 that comprises a plug'n'play communication protocol approach to a field bus interface in order to reduce the number of styles of a communication adapter. In this example embodiment, only a single communication adapter module (CAM) 18 is required to be employed for each field bus, independent of the particular trip unit style. In other words, for example and without limitation, a single Modbus® CAM (M-CAM) will work with all of the particular family of trip units (e.g., family style #1; family style #2). This permits a single style of CAM to support a plurality of different trip unit styles, which reduces the number of styles of the example CAM 18. However, other communication configurations can be employed.

As shown in FIGS. 4A and 4B, the trip unit 24 can optionally have an architecture that includes a plurality (shown as three) example independent functional sections: (1) a processor 30 which can be part of an example protection processor (PP) 110; (2) an operator panel, such as the example Human-Machine Interface (HMI) 1125 comprising a trip unit's display/operator panel 25; and (3) a communication adapter module (CAM) 18. The CAM 18 is a device that connects a product to a communication network (e.g., a communications or field bus 40). Alternatively, the PP 110 and the HMI 1125 can be combined into a single functional unit.

FIGS. 4A, 4B also illustrate the separable contacts 6 and an operating mechanism, such as the example trip actuator circuit (TA) 8 structured to open and close the separable contacts 6. The trip unit 24 controls the trip actuator 8 to trip open the separable contacts 6. The trip unit 24 can include a protection processor circuit (PP) 110, having the processor 30 and a first memory 14 storing a first set of a plurality of trip unit settings 16. The trip unit 24 can comprise a communication adapter module (CAM) 18, which is separable from the example PP 110 or separable from the trip unit 24. The example CAM 18 includes a second processor 20 and a second memory, such as a non-volatile memory 22, storing a second set of a plurality of trip unit settings 124. The example CAM 18 is structured to save the trip unit settings 16 as the saved settings 124 in the second memory 22, and to restore the saved settings 124 in the first memory 14 of the PP 110 or of another processor (not shown) of another trip unit (not shown). Hence, if the trip unit 124 or PP 110 fails, then the CAM 18 can be separated therefrom and installed on another trip unit (not shown) or PP (not shown), and the saved settings 124 can be downloaded from the CAM memory 22 to the trip unit memory 14 of the other trip unit or PP. The PP 110 saves the saved settings 124 in the separable CAM 18 and provides the ability to restore those settings 124 in a replacement trip unit (not shown) or PP (not shown). The PP 110, the HMI 1125 comprising the display 25 and the CAM 18 can communicate, for example, through two example full-duplex serial links 1128,1130 (e.g., without limitation, RS-422): (1) the serial link 1128 is between the PP 110 and the HMI 1125; and the serial link 1130 is between the PP 110 and the CAM 18. Each of the PP 110, the HMI 1125 and the CAM 18 is, thus, structured to communicate through one or both of the example full-duplex serial links 1128, 1130. See, e.g., U.S. Pat. No. 8,649,147 for examples of trip units 24 having the above-components, the contents of which are hereby incorporated by reference as if recited in full herein.

Still referring to FIGS. 4A and 4B, as discussed above, the trip unit 24 can cooperate with and/or include at least one lock-out actuator 28a and at least one lock-out lock 28. The lock out actuator 28a can be powered by the internal power supply 33. The processor 30 can be coupled to the lock out actuator 28a to controllably actuate the actuator 28a to move the lock 28 to the locked position or the unlocked position in response to electronic input from a user, typically via an electronic key. The processor 30 can also be coupled to the position sensor 29. A lock-out status signal can be transmitted to the communication link 1128 to the HMI and display 25. When in a locked-out state, a lock-out status signal can be transmitted to the dashboard 50 via communication link 1130 to the communication interface 32, then to the communication bus 40, optionally via another communications interface 132 (FIG. 4B).

The PP 110 can also output to a number of trip and status indicators, such as a plurality of cause of trip LEDs 46. A +3 VDC battery 42 in a frame rating module/bridge circuits interface 44 can provide redundant power for the cause of trip LEDs 46. If the circuit interrupter 15 were to trip and control power be lost, then the LED states can be maintained in a latch 48 by the battery 42. This battery 42 can be located at any suitable position on the trip unit 24.

A high instantaneous trip circuit 56 is a separate analog peak detecting circuit set to match the withstand rating of the frame of the circuit breaker 15. The high instantaneous trip circuit 56 can trip the circuit breaker 15b without any intervention by the processor 30. This provides trip operation faster than a short delay setting and acts as a fail-safe in the event of a failure of the processor 30. A making current release (MCR) circuit 58 is a safety feature that prevents the circuit breaker 15b from being closed and latched-in on a fault. This can be a non-adjustable sensing circuit.

Where used, the CAM 18 can include a second communication interface 132 that provides a connection to a communication network (e.g., without limitation, a communications (field) bus 40). For example, multiple styles of the CAM 18 can be provided to support various field bus interfaces (e.g., without limitation, Modbus®; PROFI BUS PROCESS FIELD BUS®; INCOM; Ethernet; DeviceNet). For example and without limitation, an Ethernet CAM can support a "tool kit" that provides a set of common machine-to-machine services along with a web page server, a BACnet interface, and ModBus® TCP. Non-limiting examples of the INCOM network and protocol are disclosed in U.S. Pat. Nos. 4,644,547; 4,644,566; 4,653,073; 5,315,531; 5,548,523; 5,627,716; 5,815,364; and 6,055,145, which are incorporated by reference as recited in full herein. Hence, the CAM 18 can be selected from a plurality of different CAMs (not shown) to provide an interface to a selected one of a plurality of corresponding different field busses (not shown).

Where used, the CAM 18 can optionally further includes a set 72 of breaker open/close relays and contacts. Circuit breaker open and close relays (not shown) are controlled by the CAM processor 20 to control relay contacts (not shown) in response to a communication request through the communication interface 132 for opening or closing the circuit breaker 15b. A motor operator (not shown) can be wired through the close relay contact to close the circuit breaker 15b (when not in a locked-out state) while a circuit breaker shunt trip (not shown) can be wired through the open relay contact to open the circuit breaker 15b.

A "source ground" jumper 74 on the CAM 18 selects between residual ground current computation by the processor 30, or direct measurement of ground current via an external ground current transformer (CT) (not shown). There can be two ground fault modes that the circuit breaker 15b can be configured for: source ground or residual ground. The trip unit processor 30 can input a jumper input 76 to determine the selected configuration for the circuit breaker 15b. With the jumper 74 in, the circuit breaker 15b is in a source mode, and without the jumper 74, the circuit breaker 15b is in a residual mode.

The CAM 18 and HMI 1125 can be structured to (indirectly) communicate with each other via the PP 110 by relaying messages through the trip unit 24. The communication protocol can have a limited address field that permits each device (CAM 18, HMI 1125, or trip unit 24) to direct the communication to another device. For example, the HMI 1125 can learn and adjust setpoints located in both the trip unit 24 and the CAM 18. Since it physically connects only to the trip unit 24, it sets the address to the CAM 18 and the trip unit 24 retransmits messages from the HMI 1125 to the CAM 18 when it detects the address of the CAM 18 in the message packet. Responses from the CAM 18 are likewise retransmitted to the HMI 1125 when the trip unit 24 detects the HMI's address.

The trip actuator circuit 8 can contain logic and current amplification, allowing a trip solenoid to be activated by the processor 30. The solenoid may also be activated directly by input signals, thereby bypassing the processor 30, under extremely high input currents or in the event of a processor failure.

The example processor 30 contains programming to perform protection, metering, event capture, and communication functions. The example metering function converts voltage and current inputs to engineering units. These values are also sent to the protection algorithms to determine whether a trip condition exists. Certain events are time-stamped and stored in the nonvolatile memory 14 for eventual transmission to the HMI of the display 25 and/or CAM 18. Metered values, breaker status, and events information are transmitted over the communications ports 52, 54. In addition, various settings may be read or written over the communications ports 52,54.

Where used, the CAM 18 can comprise the second processor 20, a field-bus interface 55, and a full-duplex communication interface 132 to the device (trip unit 24) as shown in FIG. 4B. A processor programming port (not shown) can be employed to program the CAM processor 20. This is typically done once in the factory.

The second processor 20 can contain programming to handle: (1) communications with the PP 110; (2) field bus communications; and (3) event storage. Metered values, circuit breaker status, and events information are transmitted from the PP 110 to the CAM processor 20. The CAM 18 updates and maintains a database of this information to support field bus communications. In addition, various settings may be read from or written to the PP 110. The processor 20 receives messages from the field bus 40, decodes the messages, and assembles the appropriate responses. The processor 20 also stores events that are received from the PP 110.

The circuit breakers 15b can be molded case circuit breakers (MCCB)s. MCCBs are well known. See, e.g., U.S. Pat. Nos. 4,503,408, 4,736,174, 4,786,885, and 5,117,211, the contents of which are hereby incorporated by reference as if recited in full herein. The circuit breakers 15b can be a bi-directional DC MCCB. See, e.g., U.S. Pat. No. 8,222, 983, the content of which is hereby incorporated by reference as if recited in full herein. The DC MCCBs can be suitable for many uses such as data center, photovoltaic, and electric vehicle applications.

As is known to those of skill in the art, Eaton Corporation has introduced a line of MCCBs designed for commercial and utility scale photovoltaic (PV) systems. Used in solar combiner and inverter applications, Eaton PVGard™ circuit breakers are rated up to 600 Amp at 1000 Vdc and can meet or exceed industry standards such as UL 489B, which requires rigorous testing to verify circuit protection that meets the specific requirements of PV systems. However, it is contemplated that the circuit breakers 15b can be used for various applications with corresponding voltage capacity/rating.

In some embodiments, the circuit breakers 10 can be DC circuit breakers, AC circuit breakers, or both AC (alternating current) and DC (direct current) circuit breakers.

Referring now to FIGS. 5A and 5B, an example electrical distribution system 10 with at least one circuit interrupter 15 and a remote dashboard 50 is shown. The remote dashboard 50 can be provided on a workstation stand and comprise a display 50d. The display 50d can be configured to illustrate operational status of a plurality of circuit interrupters 15 as virtual circuit interrupters 15v. A circuit interrupter 15 that is locked out can be virtually represented in a visually prominent format different from other display formats of circuit interrupters in other states. As shown, the virtual representation 15v of the locked out circuit interrupter 15l is shown with a visually transmissive overlayer of a color and/or graphic that is different from circuit interrupters having ON, OFF or tripped states. For example, all connected circuit interrupters 15 can be represented by a corresponding rectangular graphic 15r. A "red" visually transmissive overlayer 15o can be displayed over a rectangular graphic 15r representing the locked out circuit interrupter 15l. The dashboard 50 can also be configured to provide the date and name of the user placing the circuit interrupter 15 in the locked out state. The dashboard 50 can be configured to monitor a duration of the locked out status of a respective circuit interrupter 15 and provide service alerts or messages to the user that applied the locked out state or to a service manager, for example at one or more time periods thereby allowing service oversight. Data regarding undue lengths of a locked out state may be provided to the dashboard, e.g., service repair on hold for part ordering.

Figure 6:
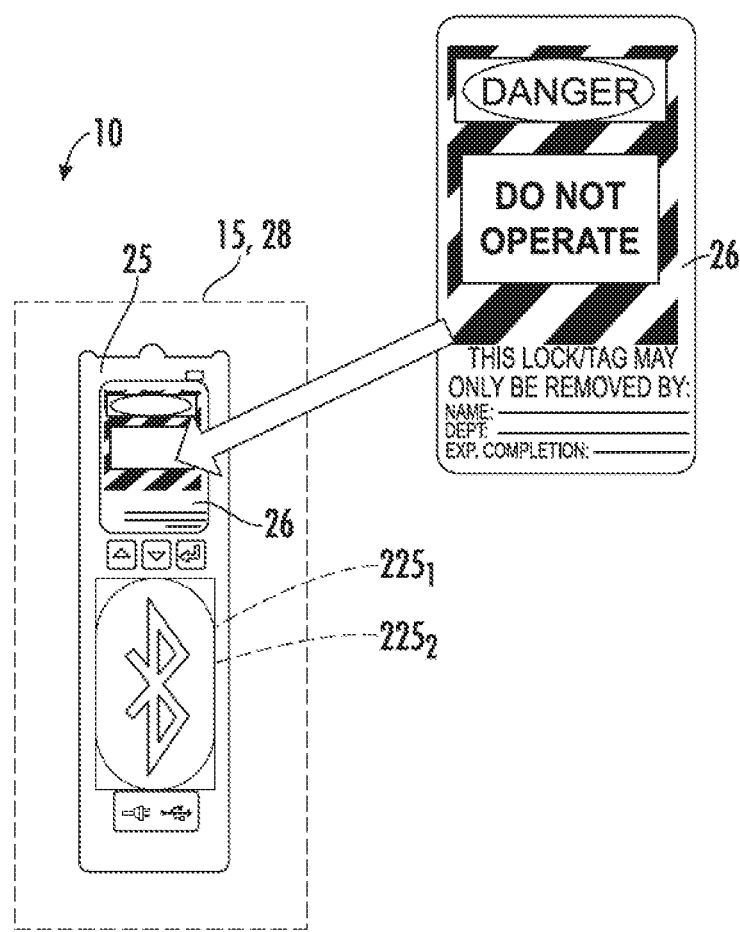
FIG. 6 is a schematic illustration of a trip unit with a user interface allowing a user to enter a digital key code for operating the lock-out lock according to embodiments of the present invention.

FIG. 6 illustrates that the circuit interrupter 15 can be configured to allow a user to enter a personalized code as the digital key 225 via an HMI 1125 such as the display 25, a keypad 125 or BLUETOOTH wireless communication entry from a mobile device 200. A user may also enter other relevant tag out data electronically, including expected completion date. The personalized code can be electronically correlated to a user's name and department and this data can be automatically populated in fields of a display screen to display 25 as part of the LOTO display 26. This same personalized code can be used to remove the lock out state and move the lock out lock 28 to the unlocked position in the circuit interrupter 15. Multiple users, each with unique (personalized) codes can be supported to provide a digital LOTO hasp. That is, the circuit interrupter 15 can be configured to require multiple digital keys $225_1$, $225_2$ be entered and/or transmitted before directing the lock out lock 28 to move to an unlocked position as a multi-lock safety hasp.

Figure 7:
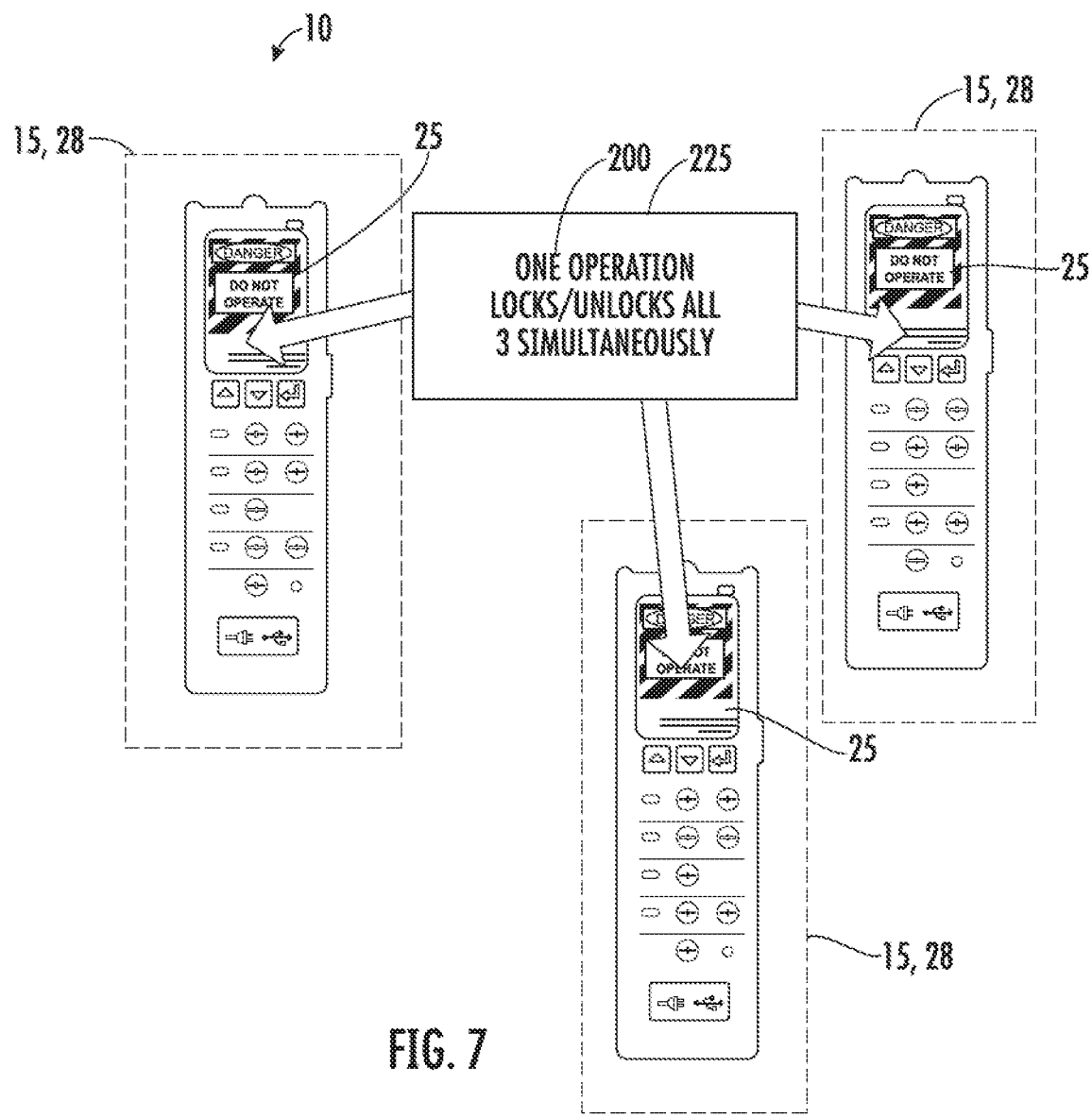
FIG. 7 is a schematic illustration of a system configured to allow one input to concurrently electronically move a lock-out lock of various circuit interrupters to a lock position or to an unlocked position using one or more digital keys according to embodiments of the present invention.

FIG. 7 is a schematic illustration of at least one digital key 225 configured to concurrently (or substantially concurrently, such as within 30 seconds of each other) lock and/or unlock a plurality of circuit interrupters 15. The system 10 can be configured to apply or remove multiple lock-out locks 28 with a single operation using one electronic key 225 or using multiple electronic keys (of the same or different users) for additional safety.

Embodiments of the present invention can provide the ability to pair multiple electronic keys, for example, in complex main tie main lineups, instead of having to fumble with multiple keys and locks. Embodiments of the invention can provide lock-out relationship profiles 52 (FIG. 1) in a database in communication with or onboard the dashboard 50 and/or via the mobile device 200 that electronically direct the lock-out locks 28 to lock/unlock multiple different circuit interrupters 15 defined by the relationship profiles and these different electronic keys can change between protection schemes defined by the profiles. This can open up the possibility of operating conventional manual transfer schemes remotely while maintaining safety against unwanted manual operations.

Figure 8:
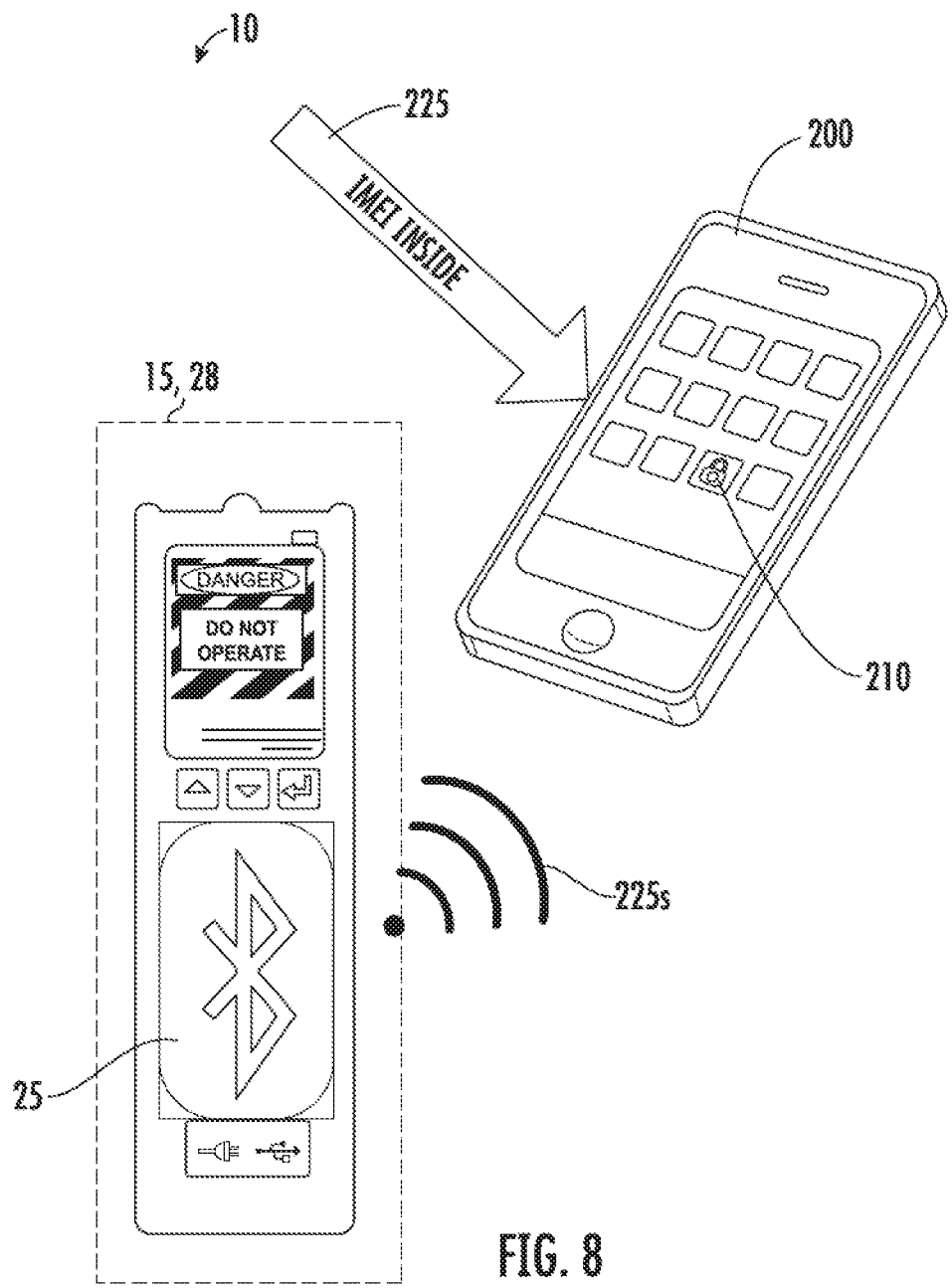
FIG. 8 is a schematic illustration of system that employs a unique identifier associated with a mobile device to provide a digital key for operating the lock-out lock according to embodiments of the present invention.

FIG. 8 is a schematic illustration of a system 10 configured to use (personal) smartphones as the mobile devices 200 to provide a digital key 225 that accepts a digital key signal 225s. For example, smart phones have a unique digital identifier, known as IMEI—International Mobile Equipment Identity. Thus, a user can electronically direct the lock-out lock 28 to more to the locked position or direct the lock-out lock 28 to more to the unlocked position using a (personal) smart phone, optionally via an APP on the mobile device 200. The digital key 225 can be the smartphone's IMEI. The mobile device 200 can communicate with the trip unit 24 via BLUETOOTH communication. Again, the trip unit 24 can display the do not operate tag on the display 25.

Figure 9:
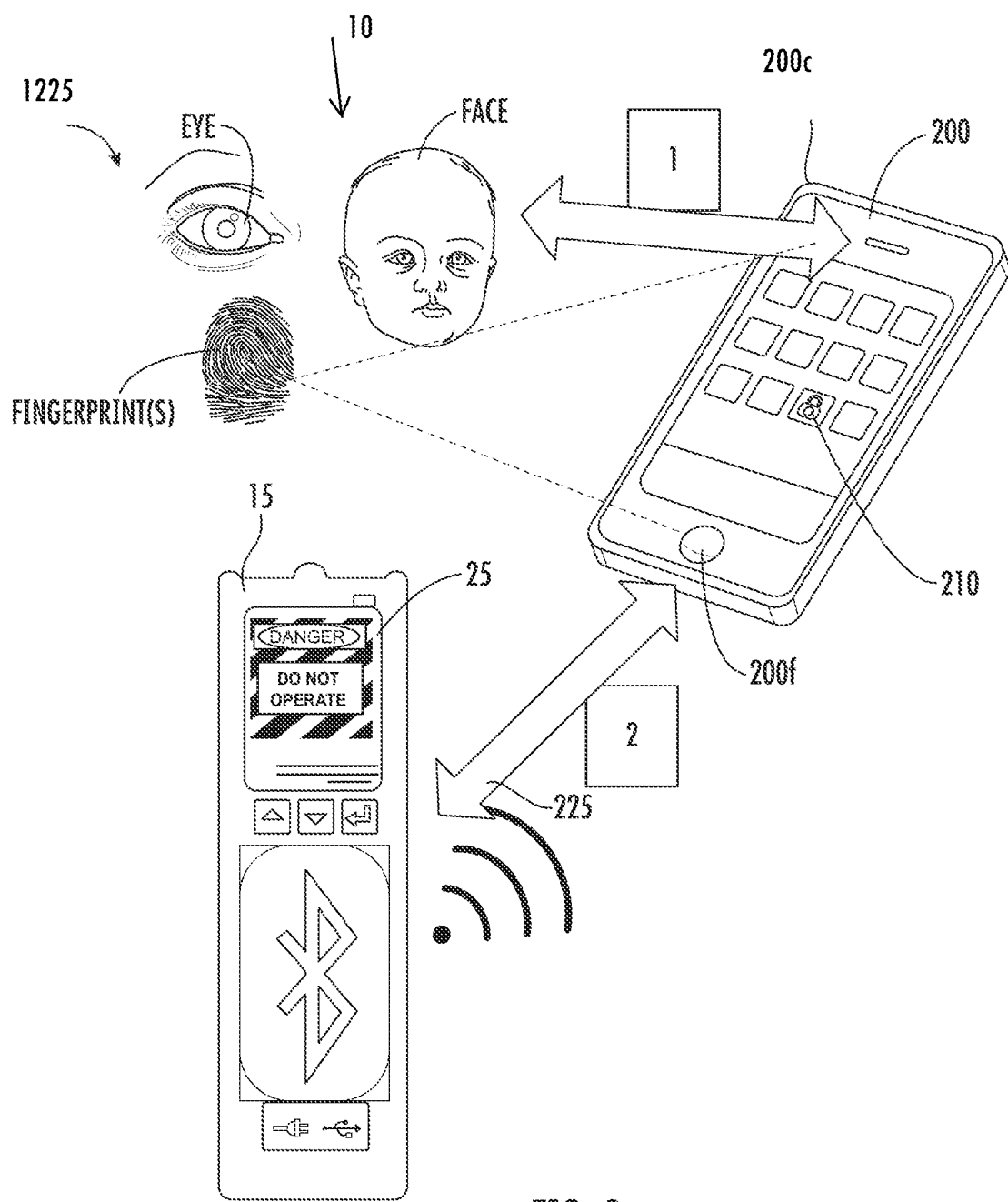
FIG. 9 is a schematic illustration of system that employs biometric data of a user for operating the lock-out lock according to embodiments of the present invention.

FIG. 9 is a schematic illustration of a system 10 that can employ biometric data 1225 to identify authorized users used for generating or verifying a digital key 225. For example, a user can use a smartphone 200 to detect biometric data of that user that can be used by a LOTO APP 210.

The biometric data 1225 can include facial recognition, fingerprints, eye retina or iris, even voice identification. For example, the biometric data 1225 can comprise a photograph taken by a camera of the mobile device or fingerprint data using a fingerprint scanner of the mobile device 200.

In other embodiments, the circuit interrupter 15 can be configured to provide a biometric identification system that obtains biometric data of a user before allowing electronic operation of the lock-out lock to the locked position and to the unlocked position.

By way of example, a user can electronically direct the lock-out lock 28 to move to the locked out position or move the lock-out lock 28 to the unlocked positon by using a mobile device such as a smartphone, optionally with an APP 210. The APP 210 can obtain the biometric data 1225. In one example, the camera 200c can take a picture of the user and apply commercial facial recognition techniques. The APP 210 can electronically transmit the facial identification data to trip unit 24 (using BLUETOOTH, for example), optionally via the communications interface 32, that then directs the lock-out lock 28 to move to the locked position thereby locking the circuit interrupter 15 in the locked out state. Again the trip unit 24 displays the do not operate tag. The process can be used in the reverse, optionally also providing a verification step within the APP 210, such as with a time sensitive digital code, before allowing a user via the mobile device 200 to move the lock-out lock 28 to the unlocked position.

Figure 10:
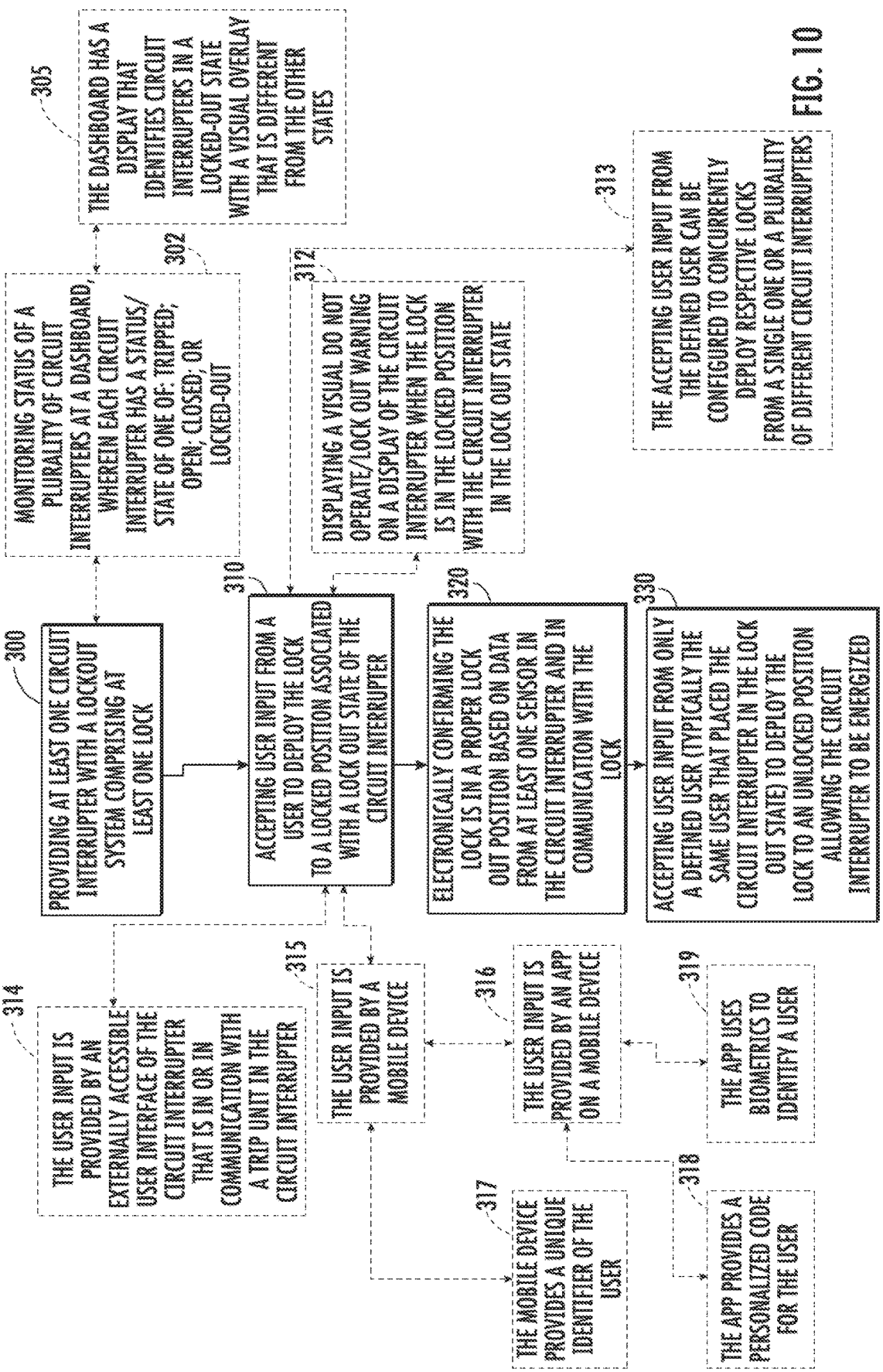
FIG. 10 is a flow chart of example actions that can be used to control a lock-out state of a circuit interrupter according to embodiments of the present invention.

FIG. 10 is an example flow chart of actions that can be carried out according to embodiments of the present invention. At least one circuit interrupter with a lock-out system comprising a lock-out lock is provided (block 300). User input from a user is accepted to deploy the lock to a locked position associated with a lock out state of the circuit interrupter (block 310). The lock is electronically confirmed to be in a proper lock out position based on data from at least one sensor in the circuit interrupter and in communication with the lock (block 320). User input is electronically accepted from only a defined user (typically the same user that placed the circuit interrupter in the lock out state) to deploy the lock to an unlocked position allowing the circuit interrupter to be energized (block 330).

Status of a plurality of circuit interrupters is monitored at a dashboard, wherein each circuit interrupter has a status/state of one of: tripped; open; closed; or locked-out (block 302).

The dashboard has a display that identifies circuit interrupters in a locked-out state with a visual overlay that is different from the other states (block 305).

A visual "DO NOT OPERATE"/lock out warning is displayed on a display of the circuit interrupter when the lock is in the locked position with the circuit interrupter in the lock out state (block 312).

The accepting user input from the defined user can be configured to concurrently deploy respective lock-out locks from a single one or a plurality of different circuit interrupters (block 313).

The user input can be provided by an externally accessible user interface of the circuit interrupter that is in the trip unit or in communication with the trip unit in the circuit interrupter (block 314).

The user input can be provided by a mobile device (block 315).

The user input can be provided by an APP on a mobile device (block 316).

The mobile device can provide a unique identifier of the user (block 317).

The APP can provide a personalized code for the user (block 318).

The APP can use biometrics to identify a user (block 319).

Figure 11:
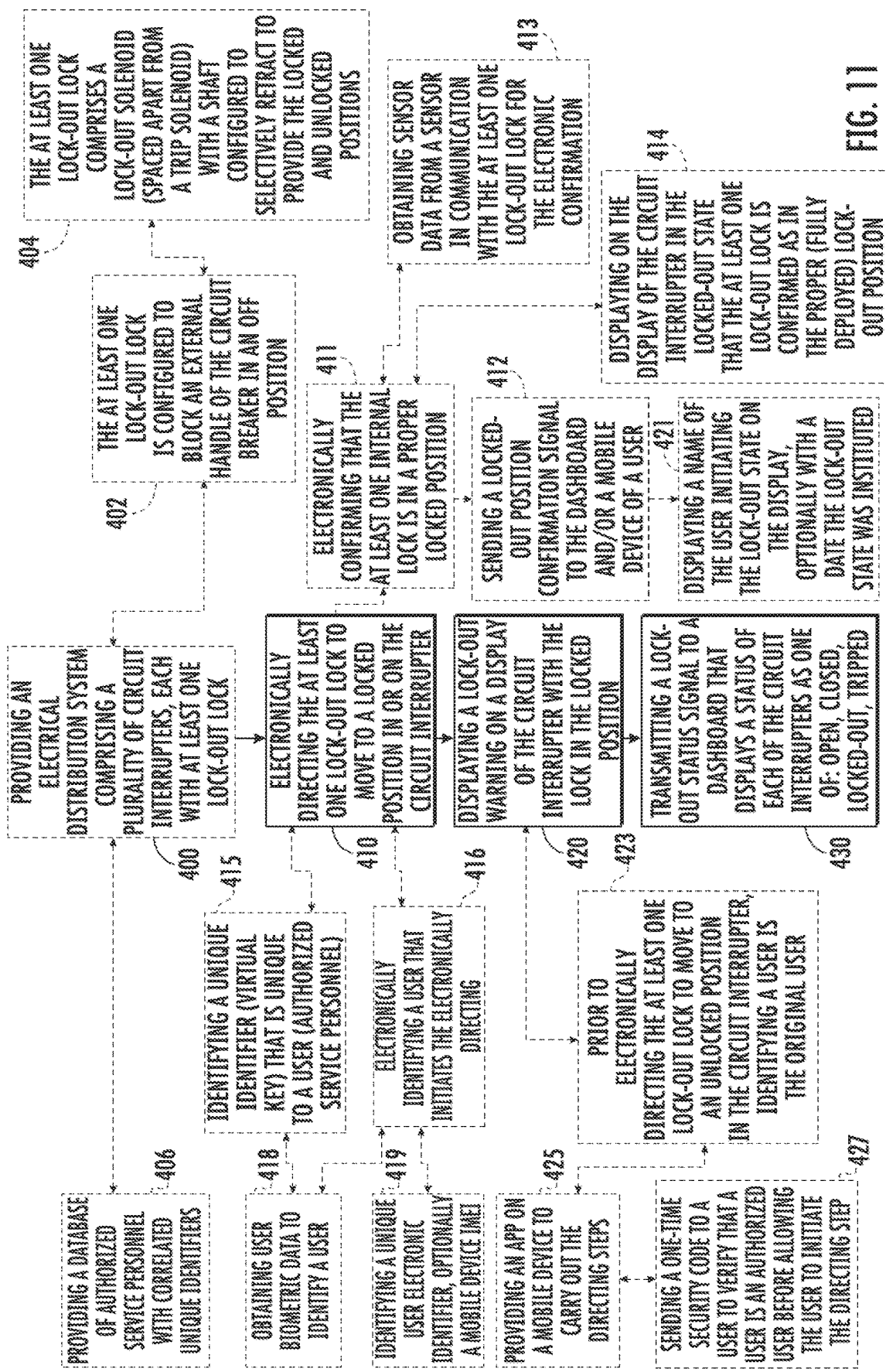
FIG. 11 is a flow chart of example actions of an electrical distribution system for initiating and removing a LOTO state of a circuit interrupter according to embodiments of the present invention.

FIG. 11 is an example flow chart of actions that can be carried out according to embodiments of the present invention. An electrical distribution system comprising a plurality of circuit interrupters, each with at least one lock-out lock, is provided (block 400). The at least one lock-out lock is electronically directed to move to a locked position in or on or in and on the circuit interrupter (block 410). A lock-out warning is displayed on a display of the circuit interrupter with the lock in the locked position (block 420). A lock-out status signal is transmitted to a dashboard that displays a status of each of the circuit interrupters as one of: open, closed, locked-out, tripped (block 430).

The at least one lock-out lock can be configured to block an external handle of the circuit breaker in an OFF position (block 402).

The at least one lock-out lock comprises a lock-out solenoid (different from and optionally spaced apart from a trip solenoid) with a shaft configured to selectively extend and retract to provide the locked and unlocked positions (block 404).

The at least one lock can be electronically confirmed to be in a proper locked position (block 411).

A locked-out position confirmation signal can be sent to the dashboard and/or a mobile device of a user (block 412).

Sensor data can be obtained from a sensor in communication with the at least one lock-out lock for the electronically confirmation (block 413).

Displaying on the display of the circuit interrupter in the locked-out state that the at least one lock-out lock is confirmed as in the proper (fully deployed) locked-out position (block 414).

Displaying a name of the user initiating the lock-out state on the display, optionally with a date the lock-out state was instituted (block 421).

A database of authorized service personnel with correlated unique identifiers can be provided (block 406).

The circuit interrupter or mobile device can identify a unique identifier (virtual key) that is unique to a user (authorized service personnel) (block 415).

The circuit interrupter or mobile device can electronically identify a user that initiates the electronically directing (block 416).

User biometric data to identify a user can be obtained (block 418).

Before electronically directing the at least one lock, a unique user electronic identifier, optionally a mobile device IMEI, can be identified (block 419).

An APP accessed using a mobile device can be provided to communicate with the circuit interrupter and carry out the directing steps (block 425).

A one-time security code can be sent to a user to verify that a user is an authorized user before allowing the user to initiate one or either of the directing steps (block 427).

Prior to electronically directing the at least one lock-out lock to move to an unlocked position in the circuit interrupter, identifying that a user is the original user (block 423).

Figure 12:
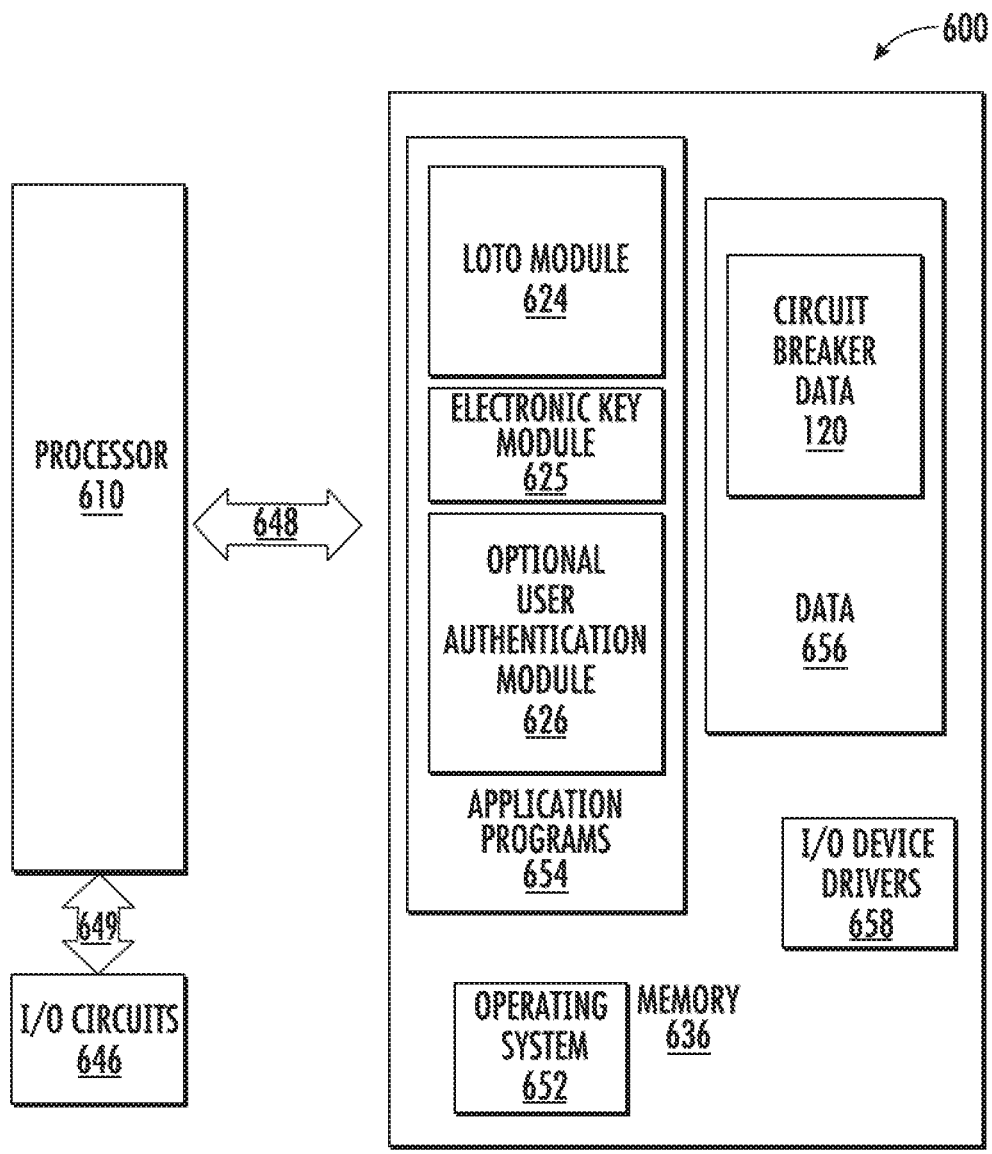
FIG. 12 is a schematic diagram of an example data processing system according to embodiments of the present invention.

Referring to FIG. 12, embodiments of the invention may be configured as a data processing system 600, which can include a (one or more) processors 610, a memory 636 and input/output circuits 646.

The one or more processors 610 can be part of a server, router, mobile device, dashboard or trip unit processing circuit.

The data processing system 600 may be incorporated in, for example, one or more of a mobile device such as a smartphone or personal computer, database, dashboard, server, router or the like.

The data processing system 600 can reside on one machine or be distributed over a plurality of machines and/or in the "cloud".

The processor 610 communicates with the memory 636 via an address/data bus 648 and communicates with the input/output circuits 646 via an address/data bus 649. The input/output circuits 646 can be used to transfer information between the memory (memory and/or storage media) 636 and another computer system or a network using, for example, an Internet protocol (IP) connection. These components may be conventional components such as those used in many conventional data processing systems, which may be configured to operate as described herein.

In particular, the processor 610 can be commercially available or custom microprocessor, microcontroller, digital signal processor or the like. The memory 636 may include any memory devices and/or storage media containing the software and data used to implement the functionality circuits or modules used in accordance with embodiments of the present invention. The memory 636 can include, but is not limited to, the following types of devices: ROM, PROM, EPROM, EEPROM, flash memory, SRAM, DRAM and magnetic disk. In some embodiments of the present invention, the memory 636 may be a content addressable memory (CAM).

As further illustrated in FIG. 12, the memory (and/or storage media) 636 may include several categories of software and data used in the data processing system: an operating system 652; application programs 654; input/output device drivers 658; and data 656. As will be appreciated by those of skill in the art, the operating system 652 may be any operating system suitable for use with a data processing system, such as IBM®, OS/2®, AIX® or zOS® operating systems or Microsoft® Windows® 10 or WindowsXP operating systems, FreeRTOS operating system, Unix or Linux™, IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 658 typically include software routines accessed through the operating system 652 by the application programs 654 to communicate with devices such as the input/output circuits 646 and certain memory 636 components. The application programs 654 are illustrative of the programs that implement the various features of the circuits, method steps discussed above and/or modules according to some embodiments of the present invention. Finally, the data 656 represents the static and dynamic data used by the application programs 654 the operating system 652 the input/output device drivers 658 and other software programs that may reside in the memory 636.

The data 656 may include (archived or stored) digital data sets correlated to respective service operators and/or circuit interrupters such as circuit breaker data 120.

As further illustrated in FIG. 12, according to some embodiments of the present invention, the application programs 654 include a LOTO module 624, an electronic key module 625 and/or a user authentication/verification module 626. The LOTO module 624 can communicate with or provide the LOTO APP 210. The electronic key module 625 can be configured to allow custom profiles of different circuit interrupter lock-out relationships and/or different multiple electronic key operations of different users and/or different components of the electrical distribution system 10.

The application program 654 may be located in a local server (or processor) and/or database or a remote server (or processor) and/or database, or combinations of local and remote databases and/or servers.

While the present invention is illustrated with reference to the application programs 654, and modules 624, 625 and 626 in FIG. 12, as will be appreciated by those of skill in the art, other configurations fall within the scope of the present invention. For example, rather than being application programs 654 these circuits and modules may also be incorporated into the operating system 652 or other such logical division of the data processing system. Furthermore, while the application programs 624, 625, 626 are illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 12 but may be provided by other arrangements and/or divisions of functions between data processing systems. For example, although FIG. 12 is illustrated as having various modules, one or more of these modules may be combined or separated without departing from the scope of the present invention.

Where the database 55 is provided using a server 700 (FIG. 1), the server 700 may be embodied as a standalone server or may be contained as part of other computing infrastructures. The server 700 may be embodied as one or more enterprise, application, personal, pervasive and/or embedded computer systems that may be standalone or interconnected by a public and/or private, real and/or virtual, wired and/or wireless network including the Internet, and may include various types of tangible, non-transitory computer-readable media. The server 700 may also communicate with the network via wired or wireless connections, and may include various types of tangible, non-transitory computer-readable media.

The dashboard 50 and/or server 700 can be provided using cloud computing which includes the provision of computational resources on demand via a computer network. The resources can be embodied as various infrastructure services (e.g., compute, storage, etc.) as well as applications, databases, file services, email, etc. In the traditional model of computing, both data and software are typically fully contained on the user's computer; in cloud computing, the user's computer may contain little software or data (perhaps an operating system and/or web browser), and may serve as little more than a display terminal for processes occurring on a network of external computers. A cloud computing service (or an aggregation of multiple cloud resources) may be generally referred to as the "cloud". Cloud storage may include a model of networked computer data storage where data is stored on multiple virtual servers, rather than being hosted on one or more dedicated servers.

Users can communicate with the dashboard 50 and/or server 700 via a computer network, such as one or more of local area networks (LAN), wide area networks (WAN) and can include a private intranet and/or the public Internet (also known as the World Wide Web or "the web" or "the Internet." The dashboard 50 and/or server 700 can include and/or be in communication with the modules 624, 625, 626 using appropriate firewalls.

Embodiments of the present invention may take the form of an entirely software embodiment or an embodiment combining software and hardware aspects, all generally referred to herein as a "circuit" or "module." Furthermore, the present invention may take the form of a computer program product on a (non-transient) computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. As noted above, the functionality of any or all of the program modules may also be implemented using discrete hardware components, one or more application specific integrated circuits (ASICs), or a programmed digital signal processor or microcontroller. The program code may execute entirely on one computer (e.g., a workstation, circuit breaker, mobile device), partly on one computer, as a stand-alone software package, partly on the workstation's computer and partly on another computer, local and/or remote or entirely on the other local or remote computer. In the latter scenario, the other local or remote computer may be connected to the user's computer through a local area network (LAN) or a wide area network (WAN), or the connection may be made to an external computer (for example, through the Internet using an Internet Service Provider).

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

Figure 13:
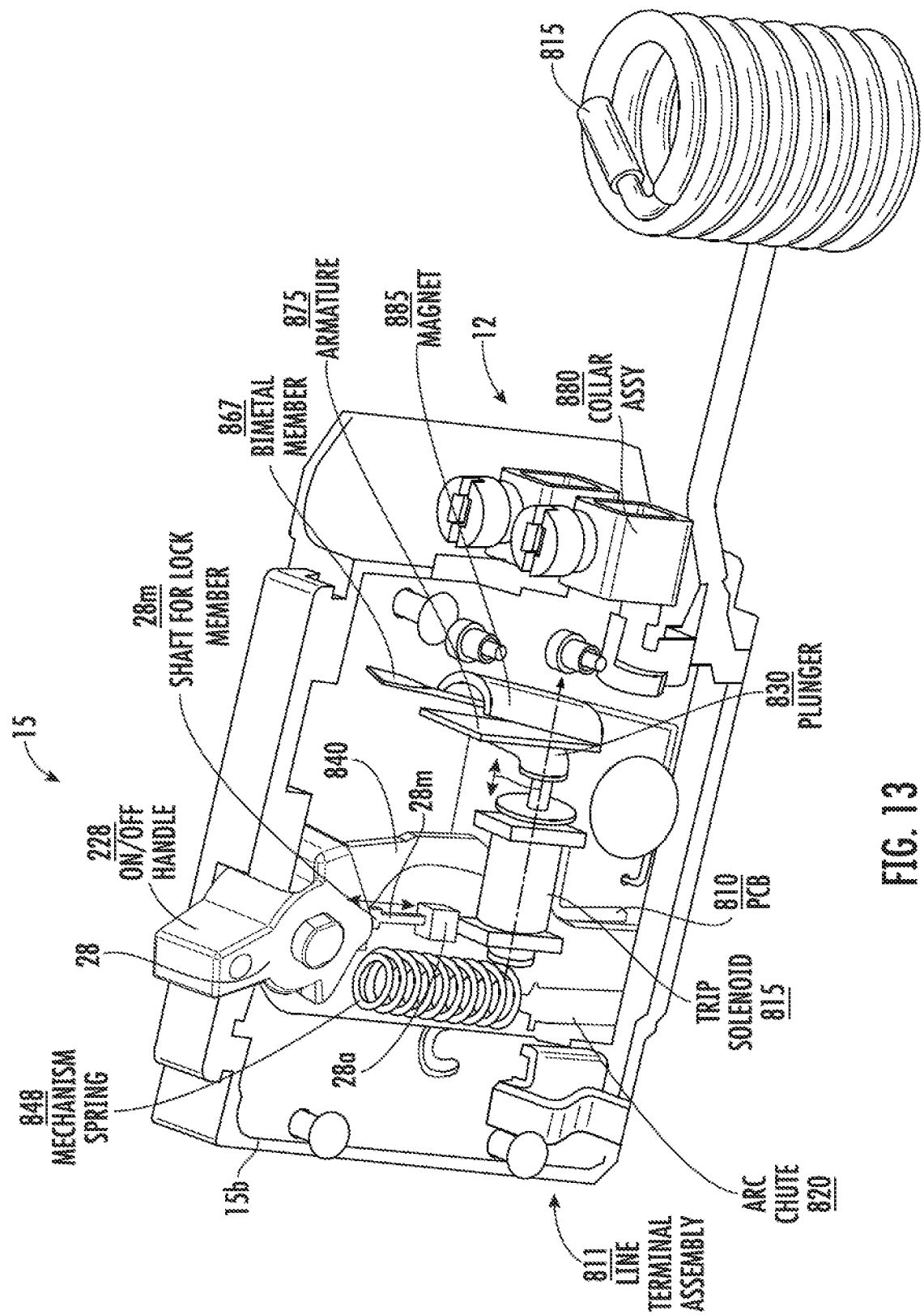
FIG. 13 is a partial cutaway view of an example circuit breaker according to embodiments of the present invention.

FIG. 13 illustrates an example circuit interrupter 15 with the at least one lock-out lock 28 and the trip solenoid 815 of a TA circuit 8. The at least one lock-out lock 28 can comprise a lock solenoid 28a that can be configured to direct the lock member 28m to travel toward the handle 228 to the locked position and away from the handle 228 to the unlocked internal position.

The trip solenoid 815 can be configured to translate toward and away from one or more of a bimetal member 867 (where a non-electronic trip unit is used), armature 875 and magnet 885. The trip solenoid 815 can be coupled to a printed circuit board 810. The travel can optionally be perpendicular to the travel direction of the trip solenoid 815. The circuit interrupter 15 may also comprise a movable contact arm 840, arc chute 820, mechanism spring 848, a collar assembly 880, a pigtail 815 and a line terminal assembly 811.

Figure 14:
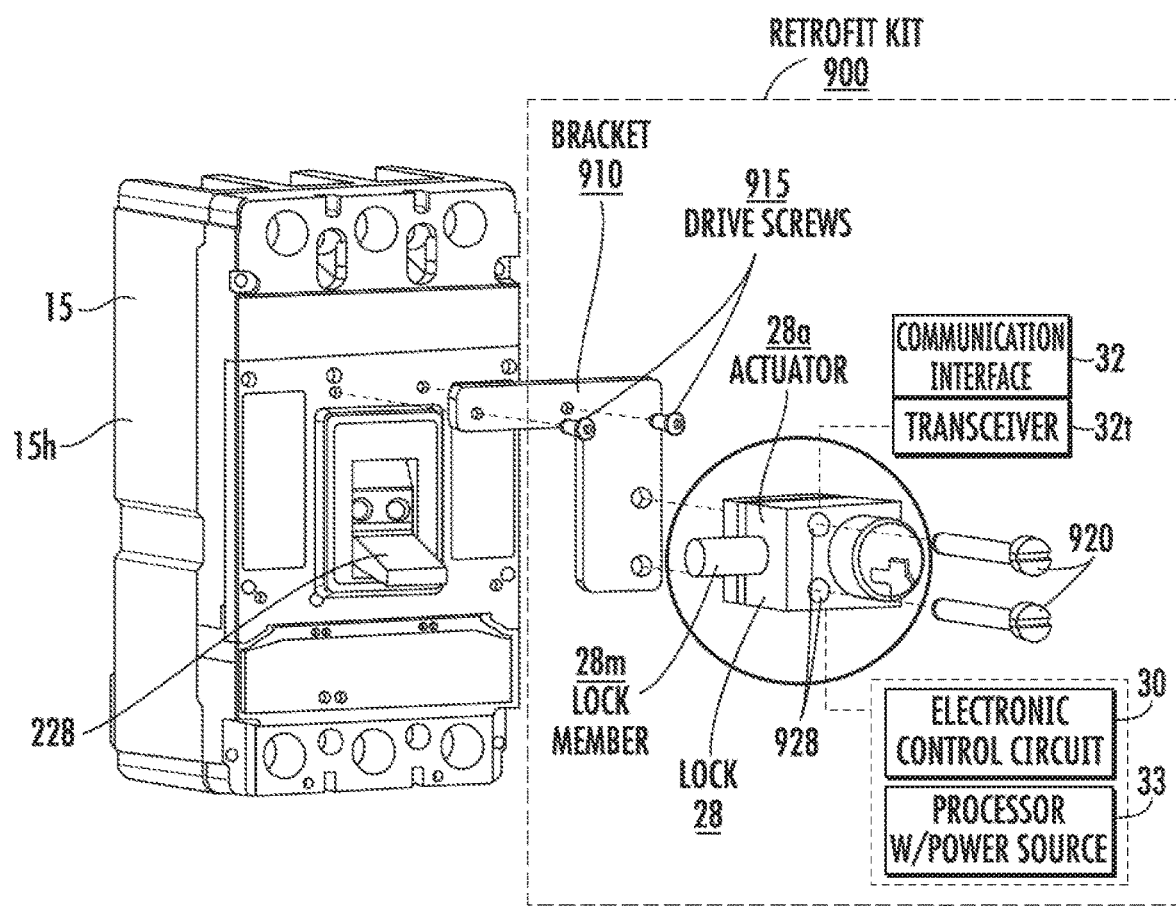
FIG. 14 is a front perspective view of an example kit of components providing electronic LOTO operation suitable for retrofit of existing circuit interrupters, such as breakers, according to embodiments of the present invention.

FIG. 14 illustrates a retrofit kit 900 that can be used to retrofit circuit interrupters 15. The kit 900 can include a bracket 915 for mounting to the housing 15h of the circuit interrupter 15 adjacent the handle 228 thereof, mounting screws 915, lock attachment screws 920 and at least one electronically operable lock-out key 28 with a lock member 28m and actuator 28a. The actuator 28a is coupled to an electronic control circuit 30 and power supply source 33 of the lock out key 28. The lock-out key 28 can also comprise a transceiver 32t and/or a communication interface 32. The lock-out key 28 may be provided separately or be provided as part of the kit 900.

As shown, the lock attachment screws 920 extend through apertures 928 in the lock out lock 28 and couple to the mounting bracket 910. The mounting bracket 910 may have an "L" shape as shown, but other shapes may be used. The mounting bracket 910 positions the lock member 28m over the handle 228 in the locked state and allows the lock member 28 to retract to unblock the handle 228 in the unlocked state.

Figure 15:
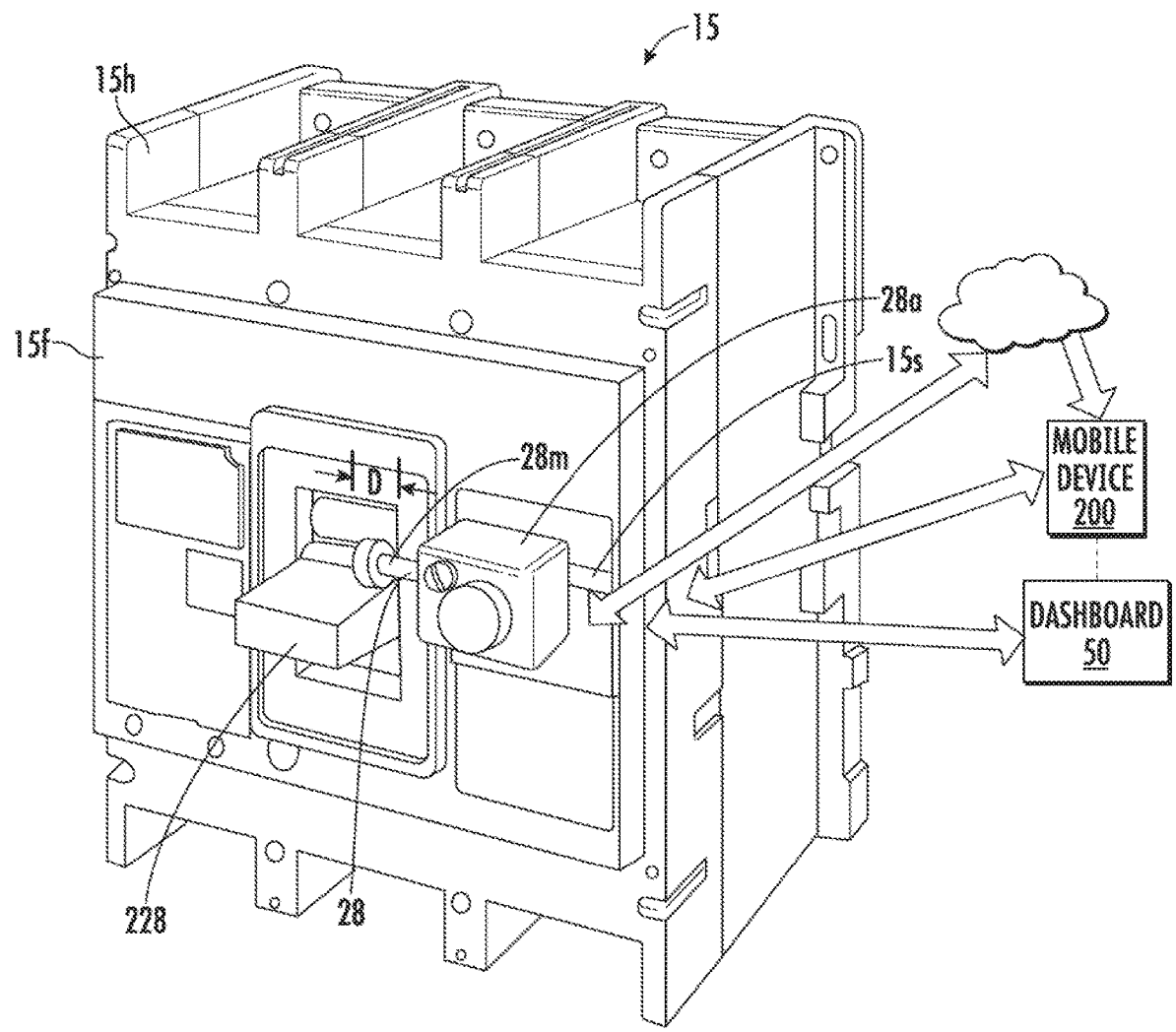
FIG. 15 is a front perspective view of an example circuit breaker with an electronically controllable key interlock according to embodiments of the present invention.

FIG. 15 illustrates a circuit interrupter 15 comprising an electronically operable lock-out lock 28 coupled to a front surface 15*f* of a housing 15*h* with the lock member 28*m* extending laterally a distance D over the handle 228 in a locked/blocked state. This configuration is not required to be only for (field or factory) retrofit but may be OEM as well or alternatively. The distance "D" can be at least 25% of a lateral extent of the handle 228 and may extend in a range between 25% and 150% of the lateral extent of the handle 228, from an outermost position that positons the lock member 28*m* spaced apart a distance from the handle 228 so that it does not block movement of the handle 228.

The lock-out lock 28 may be slidably mounted to the housing 15*h* and can be coupled to a slot 15*s* and electronically actuated to travel right and left the distance D between blocked and unblocked positions. The lock-out lock 28 can be configured to communicate with a mobile device 200 of a user/technician and/or dashboard 50.

Figure 16:
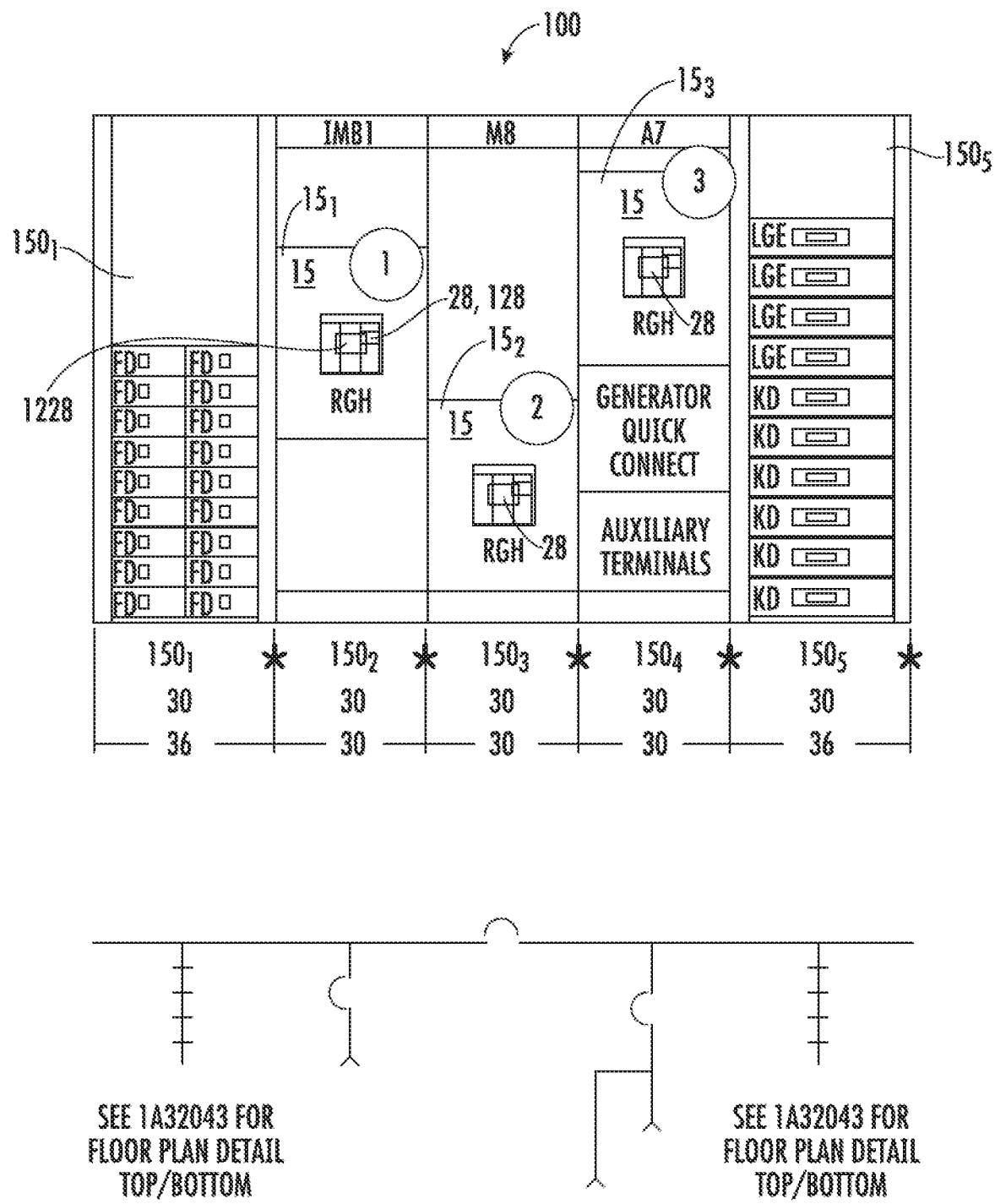
FIG. 16 is an example electrical power distribution system comprising a main-tie-main configuration with interlock keys comprising electronically operable LOTO according to embodiments of the present invention.

FIG. 16 illustrates an example power distribution system cabinet 100 with a plurality of circuit interrupters 15 in the second to fourth sections $150_2$, $150_3$, $150_4$ between feeder sections $150_1$, $150_5$ and one or more of the circuit interrupters 15 can include the at least one electronically operable lock-out lock 28. In this example, there are three circuit breakers $15_1$, $15_2$, $15_3$ provided as the circuit interrupters 15.

The first breaker $15_1$ is the incoming main from utility power. The third breaker $15_3$ is the alternate incoming main (ex from a generator). The first and fifth sections $150_1$ and $150_5$ are "feeder" sections that run to multiple downstream loads in the system. Both structures need power at the same time but the ability to be separated if necessary.

The second breaker $15_2$ is the "Tie" breaker that connects the left side and right side of the lineups.

Breakers $15_1$, $15_2$, and $15_3$ can all have lock-out key locks 28 attached to them but only two can be closed at any one time. Normal Protocol: Breakers $15_1$ & $15_2$ are in the "CLOSED" position. Sections $150_1$ and $150_5$ are both receiving power. Breaker $15_3$ must remain in the "OPEN" position. Back-up Protocol: Breakers $15_2$ & $15_3$ are in the "CLOSED" position. Sections $150_1$ and $150_5$ are both receiving power. Breaker $15_1$ must remain in the "OPEN" position.

Alternate Protocol: Breakers $15_1$ & $15_3$ are in the "CLOSED" position. Section $150_1$ receives power from Main 1; Section $150_5$ receives power from Main 3. The Tie breaker $15_2$ is OPEN so the left and right sections are not connected.

Breakers $15_1$, $15_2$, & $15_3$ are never all allowed to be concurrently "CLOSED". If all three were closed concurrently, this condition can allow utility power and generator power to enter the system at the same time which is undesirable (likely damage to generator & other equipment).

The power system 10, power distribution cabinet 100, dashboard 50, database 55 and/or LOTO APP 210 can be configured to communicate with the three breakers $15_1$, $15_2$, and $15_3$ to know, for example, that either a) breakers $15_1$ and $15_2$ are in the ON position so the lock-out key 28 on breaker $15_3$ cannot be unlocked or b) know that locks 28 for breakers $15_1$ & $15_2$ are in the unlocked position so that lock 28 for breaker $15_3$ cannot be unlocked. The LOTO APP 210 and/or database 55 can be configured to deny access to any electronic keys and prevent actuation of respective locks 28 that would violate these rules to provide suitable safety protocols.

The three breakers $15_1$, $15_2$ and $15_3$ can be configured to communicate with each other as well as one or more of the power system 10, power distribution cabinet 100, database 55, LOTO APP 210 to provide electronic access keys to control ON and OFF states of the lock-out locks 28 based on defined safety protocols.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A circuit interrupter, comprising:
a housing with a line side and a load side;
a switch handle affixed to a front wall of the housing whereby the switch handle is non-detachably coupled to the housing; and
an electronically operable lock comprising a lock member coupled to the housing configured to electronically controllably travel between a first position and a second position, wherein, in the second position, the lock member is in a lock-out position and prevents the switch handle from moving to an ON position associated with electrical current conduction, and wherein, in the first position, the lock member is in a position that allows the switch handle to move to the ON position.

2. The circuit interrupter of claim 1, wherein the lock comprises a lock actuator that is spaced apart from a primary trip solenoid.

3. The circuit interrupter of claim 2, wherein the lock actuator travels in a direction that is toward the handle to move the lock member to the second position and travels in an opposing direction that is inward away from the handle to move the lock member to the first position.

4. The circuit interrupter of claim 2, wherein the lock member travels in a direction that is perpendicular to a direction of travel of the primary trip solenoid.

5. The circuit interrupter of claim 1, further comprising a position sensor coupled to the housing configured to confirm whether the lock member is in the second position.

6. The circuit interrupter of claim 1, wherein the lock member is configured to controllably move to the first position and/or the second position in response to activation of an actuator of the lock by one or more defined electronic keys.

7. The circuit interrupter of claim 1, wherein a primary trip solenoid and the lock are provided as components of a trip unit in the housing, and wherein the trip unit comprises a communications interface with a display and is configured to communicate with a communications bus of an electrical distribution system.

8. The circuit interrupter of claim 1, wherein the lock member of the lock physically blocks the handle from moving and provides a force that resists manual movement of the handle in a range of 10 lbf (foot pounds) to 10,000 lbf (foot pounds) when in the locked-out position.

9. A circuit interrupter, comprising:
a housing with a line side and a load side;
a switch handle coupled to the housing;
an electronically operable lock comprising a lock member coupled to the housing configured to electronically controllably travel between a first position and a second position, wherein, in the second position, the lock member is in a lock-out position and prevents the switch handle from moving to an ON position associated with electrical current conduction, and wherein, in the first position, the lock member is in a position that allows the switch handle to move to the ON position;
a display held by the housing; and
at least one processor in the housing in communication with a primary trip solenoid and the lock, wherein, when the lock member is in the second position, the display displays visual indicia of a lock out tag out status of the circuit interrupter.

10. The circuit interrupter of claim 9, wherein the visual indicia comprises a "DO NOT OPERATE" warning and a name of a person placing the circuit interrupter in the lock out tag out status.

11. A circuit interrupter, comprising:
a housing with a line side and a load side;
a switch handle coupled to the housing;
an electronically operable lock comprising a lock member coupled to the housing configured to electronically controllably travel between a first position and a second position, wherein, in the second position, the lock member is in a lock-out position and prevents the switch handle from moving to an ON position associated with electrical current conduction, and wherein, in the first position, the lock member is in a position that allows the switch handle to move to the ON position; and
a transceiver held by or in the housing and in communication with the lock, wherein the transceiver is configured to receive one or more control signals from a first mobile device of a first user to cause the lock member to move to the second position.

12. The circuit interrupter of claim 11, wherein the transceiver is configured to receive the one or more control signals from different mobile devices of different users and only allow the lock member to move to the second position if the user is the first user and/or the mobile device is the first mobile device to thereby provide an additional layer of safety for removing the lock out status by only the original, first user.

13. A circuit interrupter, comprising:
a housing with a line side and a load side;
a switch handle coupled to the housing; and
an electronically operable lock comprising a lock member coupled to the housing configured to electronically controllably travel between a first position and a second position, wherein, in the second position, the lock member is in a lock-out position and prevents the switch handle from moving to an ON position associated with electrical current conduction, and wherein, in the first position, the lock member is in a position that allows the switch handle to move to the ON position,
wherein the circuit interrupter is configured to wirelessly communicate with a mobile device comprising and/or in communication with an APP to control movement of the lock member.

14. A circuit interrupter, comprising:
a housing with a line side and a load side;
a switch handle coupled to the housing; and
an electronically operable lock comprising a lock member coupled to the housing configured to electronically controllably travel between a first position and a second position, wherein, in the second position, the lock member is in a lock-out position and prevents the switch handle from moving to an ON position associated with electrical current conduction, and wherein, in the first position, the lock member is in a position that allows the switch handle to move to the ON position,
wherein the circuit interrupter is configured to require multiple defined electronic key inputs before electronically directing the lock member to move from the second position to the first position.

15. A field retrofit lock-out lock system for a circuit breaker, comprising:
a bracket configured to couple to a housing of a circuit breaker; and
an electromechanical actuator assembly coupled to or coupleable to the bracket, wherein the electromechanical actuator assembly comprises:
an electronic control circuit configured to accept a digital key input from a user;
an actuator in communication with the electronic control circuit; and
a lock member controlled by the actuator, wherein the actuator is configured to move the lock member in first and second directions between first and second positions relative to a switch handle of the circuit breaker in response to directions from the electronic control circuit, wherein, in the first position, the lock member blocks the switch handle from moving, and wherein, in the second position, the lock member unblocks the switch handle.

16. The retrofit kit of claim 15, wherein the electronic control circuit comprises a transceiver.

17. The retrofit kit of claim 16, wherein the electronic control circuit is configured to wirelessly communicate with a mobile device comprising and/or in communication with an APP to control the actuator to move the lock member only upon receipt of a defined digital key input provided to the mobile device by the APP.

18. The retrofit kit of claim 15, wherein the bracket and actuator assembly reside external to the housing of the circuit breaker.

19. The retrofit kit of claim 15, wherein the electronic control circuit is configured to require multiple defined electronic key inputs before directing the actuator to move the lock member from the first position to the second position.

* * * * *